(12) United States Patent
Gupta

(10) Patent No.: US 10,844,586 B2
(45) Date of Patent: Nov. 24, 2020

(54) BIDET WASHING APPARATUS WITH DISINFECTANT WASH FEATURE

(71) Applicant: Anjum Gupta, San Diego, CA (US)

(72) Inventor: Anjum Gupta, San Diego, CA (US)

( * ) Notice: Subject to any disclaimer, the term of this patent is extended or adjusted under 35 U.S.C. 154(b) by 12 days.

(21) Appl. No.: 16/374,970

(22) Filed: Apr. 4, 2019

(65) Prior Publication Data

US 2020/0318334 A1 Oct. 8, 2020

(51) Int. Cl.
*E03D 9/08* (2006.01)
*A47K 13/00* (2006.01)
*F16M 13/02* (2006.01)
*F16C 11/04* (2006.01)

(52) U.S. Cl.
CPC .............. *E03D 9/08* (2013.01); *A47K 13/005* (2013.01); *F16C 11/045* (2013.01); *F16C 2226/60* (2013.01); *F16M 13/02* (2013.01)

(58) Field of Classification Search
CPC ........................................................ E03D 9/08
USPC ...................................... 4/443–445
See application file for complete search history.

(56) References Cited

U.S. PATENT DOCUMENTS

| | | | | |
|---|---|---|---|---|
| 4,242,764 A | * | 1/1981 | Fukuda | E03D 9/08 4/233 |
| 5,987,659 A | * | 11/1999 | Cannizzaro | E03D 9/085 4/420.2 |
| 9,637,903 B2 | * | 5/2017 | Gupta | A47K 13/26 |
| 9,822,519 B2 | * | 11/2017 | Hall | E03D 9/08 |
| 2017/0058500 A1 | * | 3/2017 | Garrels | E03D 9/032 |
| 2017/0260728 A1 | * | 9/2017 | Hall | E03D 9/08 |
| 2018/0002911 A1 | * | 1/2018 | Hall | E03D 5/105 |

* cited by examiner

*Primary Examiner* — Lori L Baker

(57) ABSTRACT

A bidet washing apparatus attachable to a toilet bowl for cleaning one or more body parts of a user includes a water inlet, a control unit, a control unit switch, and a control unit outlet; a reservoir dispenser having a chamber, a reservoir dispenser switch, a reservoir dispenser valve, and a reservoir dispenser outlet; a nozzle assembly having a washing nozzle, connected to the control unit outlet with a water tube, a protective shield gate covering the nozzle assembly and washing nozzle; and a plurality of nozzle assembly and/or gate cleaning outlets connected to the reservoir dispenser outlet with a water tube for cleaning and/or disinfecting the nozzle assembly, washing nozzle, and/or the protective gate.

18 Claims, 21 Drawing Sheets

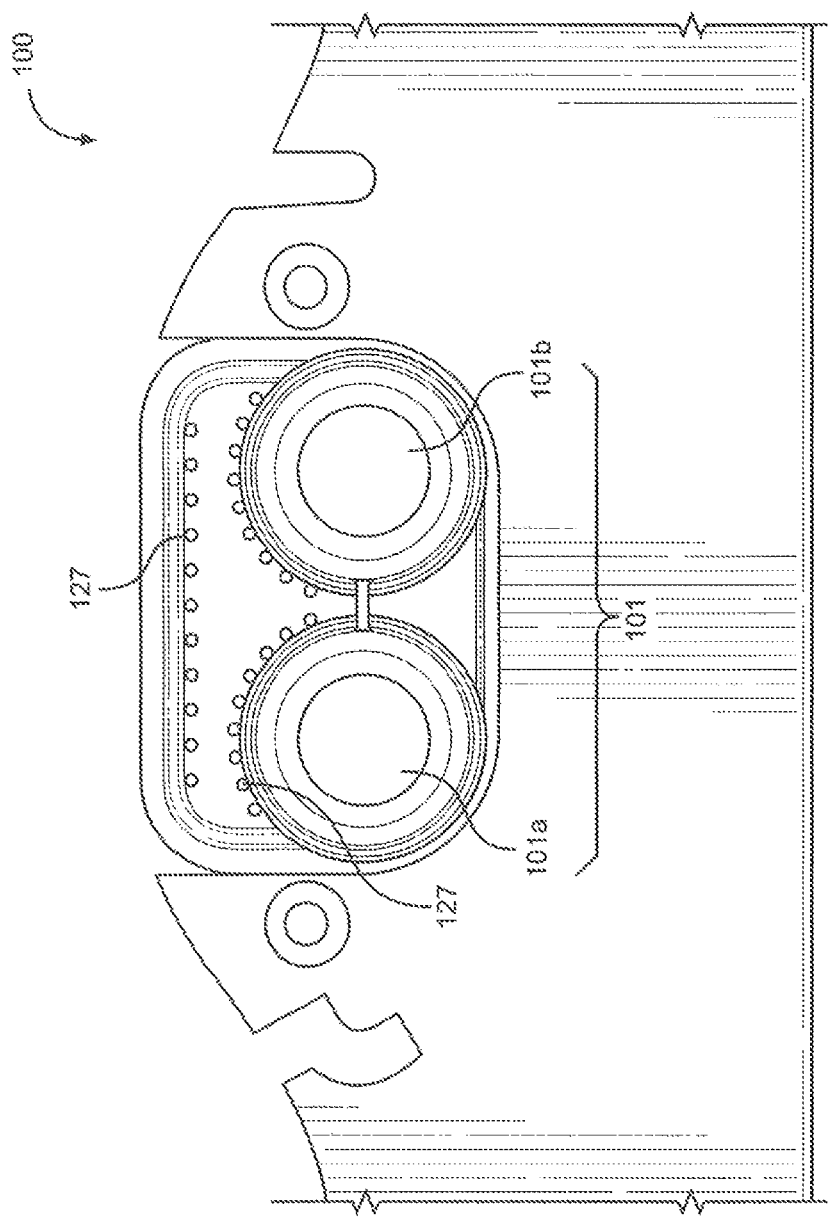

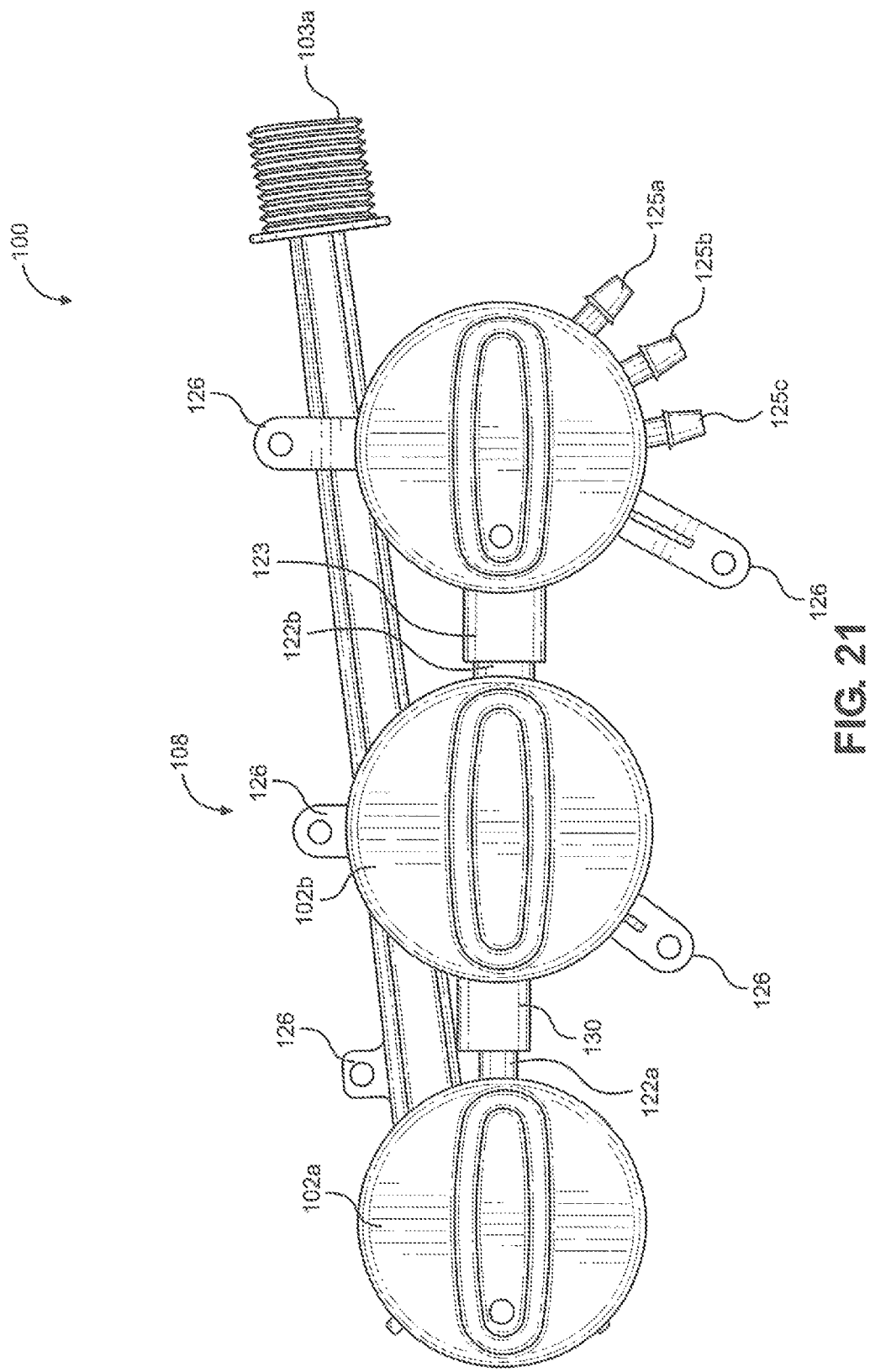

BIDET WASHING APPARATUS WITH DISINFECTANT WASH FEATURE

CROSS-REFERENCE TO RELATED APPLICATIONS

This application hereby incorporates by reference the disclosure U.S. patent application Ser. No. 15/165,789, titled: "ADJUSTABLE HINGE FASTENERS FOR USE WITH A BIDET WASHING APPARATUS," filed on May 26, 2016, the entire disclosure of which is hereby incorporated by reference in its entirety for all purposes.

FIELD OF THE INVENTION

The disclosure generally relates to a bidet washing apparatus, and more particularly to a bidet washing apparatus having a disinfectant wash feature that can store and dispense a cleaning disinfectant with a bidet washing stream.

BACKGROUND OF THE INVENTION

A bidet apparatus for washing and cleaning body parts, e.g., genital and/or anal, was initially developed in the form of a bidet that provided a single spray of water and was permanently built into the toilet bowl. However, such bidets were expensive and a new generation of bidets was developed that were attachable to the toilet, and included a plurality of nozzles for multiple water sprays. Such bidets can be attached to the seat of an existing toilet bowl for washing the private parts of a person sitting on it, using washing water sprayed from the bidet nozzles, without the use of toilet paper. Such bidets can include a plurality of nozzles for washing the private parts as well as the bidet itself.

Various bidet designs have addressed some of the desired effects, such as washing, washing with temperature-regulated water, and drying. However, existing bidets fail to address all concerns related to the designs and functions in the general field of bidets. For example, pollution of the outer surface of the nozzles, the bidet and toilet during utilization is a common problem and causes aesthetic and hygienic issues. This is particularly important in bidets used, for example, by infirm or sick people who have to be especially cautious about maintaining hygiene and preventing infections.

Currently there aren't any bidets that include a disinfectant wash feature. Many bidets have a feature to clean the nozzle of the bidet, however, cleaning the nozzle with water causes problems as it could leave behind hard water deposits and not provide adequate cleaning. Hard water deposits on the nozzle could affect the flow of the bidet as it blocks the nozzle holes and not adequately cleaning the bidet raises sanitary concerns. Consumers may also feel that normal water may not provide adequate washing of their body parts. Therefore, there remains a need to provide bidets with a disinfectant wash feature.

SUMMARY OF THE INVENTION

The disclosed embodiments are directed to solving one or more of the problems presented in the prior art, described above, as well as providing additional features that will become readily apparent by reference to the following detailed description when taken in conjunction with the accompanying drawings.

In an embodiment, the disclosure provides a bidet washing apparatus, having a control unit fluidically connected to one or more water inlets configured to supply water to the control unit, the control unit including one or more control unit switches configured to operate one or more control unit valves for controlling water flow from the one or more water inlets and/or from one or more control unit outlets; one or more reservoir dispensers having one or more chambers fluidically connected to at least one of the one or more control unit outlets, the one or more reservoir dispensers including one or more reservoir dispenser switches configured to operate one or more reservoir dispenser valves for controlling water flow from the one or more control unit outlets and/or from one or more reservoir dispenser outlets; a nozzle assembly including at least one washing nozzle, fluidically connected to at least one of the one or more control unit outlets with one or more control unit outlet to nozzle assembly water tubes; a protective shield gate covering at least a portion of the nozzle assembly including the at least one washing nozzle; and one or more nozzle assembly and/or gate cleaning outlets fluidically connected to at least one of the one or more reservoir dispenser outlets with one or more reservoir dispenser outlet to nozzle assembly and/or gate cleaning outlet water tubes.

Further features, and advantages of the disclosure, as well as the structure and operation of various embodiments of the disclosure, are described in detail below with reference to the accompanying drawings.

BRIEF DESCRIPTION OF THE DRAWINGS

The disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIGS. 13a and 13b illustrate a cut-away view of an embodiment of a bottom view of the nozzle assembly, washing nozzles, and the one or more openings with and without a shield gate;

FIG. 21 illustrates a cut-away view of an embodiment of a bidet washing apparatus with a reservoir dispenser with a removable lid or cap.

DETAILED DESCRIPTION OF EXEMPLARY EMBODIMENTS

Figure 1:
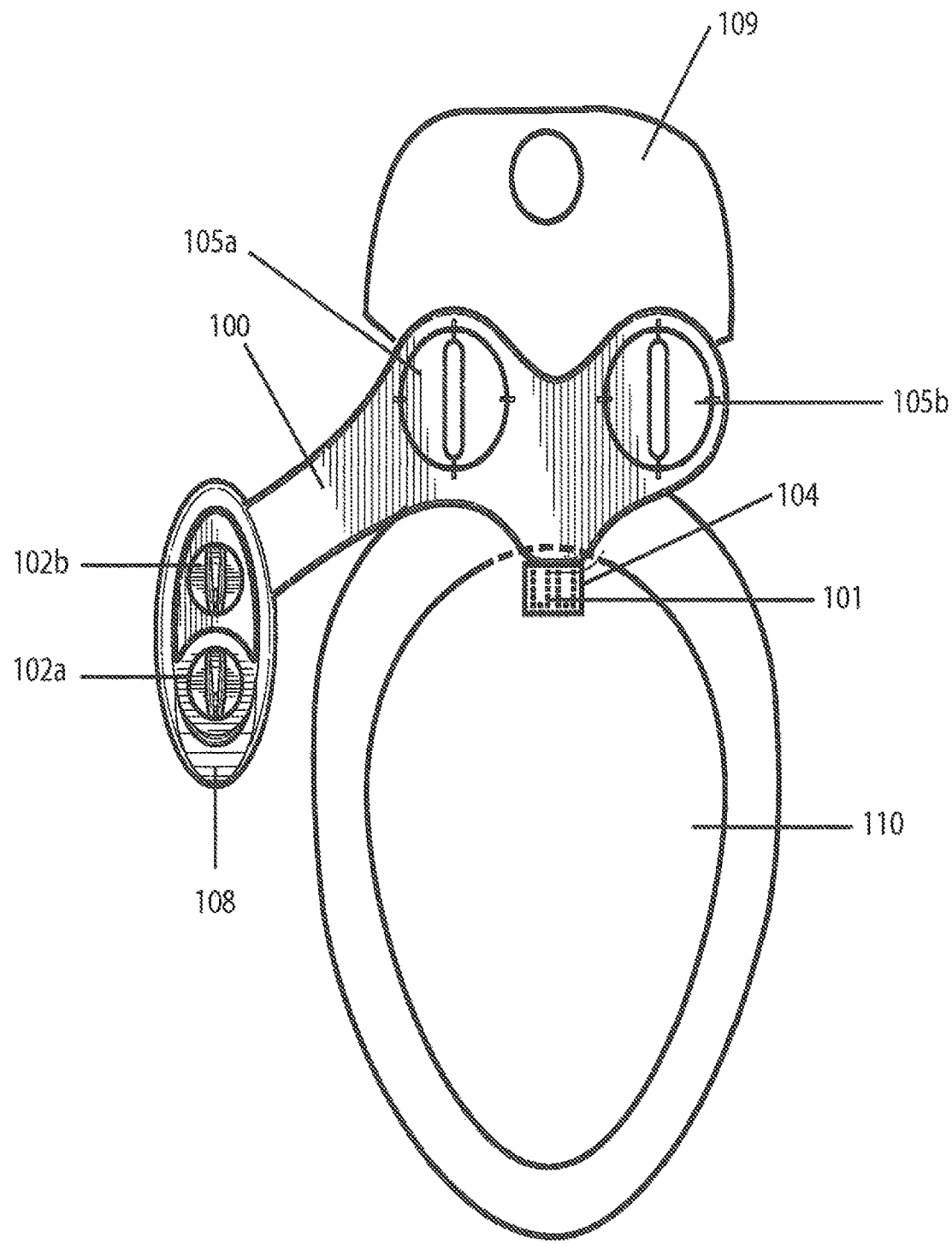
FIG. 1 illustrates an embodiment of a perspective view of an exemplary bidet washing apparatus installed on an existing toilet seat, with the seat cover up.

The following description is presented to enable a person of ordinary skill in the art to make and use embodiments described herein. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the disclosure. Thus, the disclosure is not intended to be limited to the examples described herein and shown, but is to be accorded the scope consistent with the claims.

The word "exemplary" is used herein to mean "serving as an example illustration." Any aspect or design described herein as "exemplary" is not necessarily to be construed as preferred or advantageous over other aspects or designs.

Reference will now be made in detail to aspects of the subject technology, examples of which are illustrated in the accompanying drawings, wherein like reference numerals refer to like elements throughout.

It should be understood that the specific order or hierarchy of steps in the process disclosed herein is an example of exemplary approaches. Based upon design preferences, it is understood that the specific order or hierarchy of steps in the processes can be rearranged while remaining within the scope of the disclosure. Any accompanying method claims present elements of the various steps in a sample order, and are not meant to be limited to the specific order or hierarchy presented.

The embodiments disclosed herein describe a new, clean and hygienic washing bidet. The various embodiments include one or a plurality of water inlets, a control means housing one or a plurality of control valves to control the flow of water from the water inlet(s) to one or a plurality of water tubes, one or a plurality of washing nozzles, a protective shield gate, and securing unit configured to securing the sanitary washing device to the toilet seat.

The disclosed embodiments directed to a clean and hygienic bidet washing apparatus 100 attachable to an existing toilet for cleaning the body parts of the user sitting on or near the toilet.

As described herein, a "bidet" is a toilet attachment for cleaning the body parts of the user.

As described herein, the term "water inlet" means any structure that may provide water to the bidet washing apparatus.

As described herein, a "control unit" (aka "control panel") is the housing which has "control switche(s)" thereon controlling the various functionalities of the bidet, including but not limited to, flow of water, adjusting the angle of the nozzles, and opening and closing the protective shield gate.

As described herein, "control valves" are controller parts located inside the control panel housing which control the flow of water or other fluids from the water inlet(s) to one or more "water tubes" by opening, closing or partially obstructing various passageways.

As described herein, "water tubes" are channels that connect the control valves to a "nozzle assembly," wherein, the "nozzle assembly" includes a single nozzle or a collection of nozzles including at least one "washing nozzle."

As described herein, a "nozzle" is a device designed to eject water or other fluids into the surrounding medium as a coherent controlled spray.

As described herein, the "washing nozzle" is the nozzle that can be used to wash the body parts of a user.

As described herein, the "nozzle assembly" may also have other types of nozzles such as a "self-cleaning nozzle," which is used to clean the nozzle assembly itself, a "toilet cleaning nozzle," which is used to clean the bidet and/or the toilet, and a "shield cleaning nozzle," which is used for cleaning the "protective shield gate."

As described herein, the "protective shield gate" is a structure placed at least partially in front of the nozzle assembly (e.g., between the user and the nozzle assembly) to protect the nozzle assembly from pollutants.

As described herein, the "protective shield gate" can have a "hunged" edge. The term "hinged" here means a joint that allows the turning or pivoting of the gate, by any conventional twining or pivoting mechanism.

As described herein, the term "fluidically coupled" means a connection or a passageway which allows fluid to flow therethrough.

As described herein, the term "reservoir" means a fluid holding tank.

Accordingly, in one embodiment the disclosure provides a bidet washing apparatus attachable to a toilet bowl for cleaning one or more body parts of a user. The apparatus can include one or more water inlets configured to supply water, and a control unit, housing one or more valves fluidically connected to the one or more water inlets, including one or more control switches configured to operate the one or more valves. As such, the one or more valves can control water flow from the one or more water inlets. The apparatus can further include a nozzle assembly including at least one washing nozzle, fluidically connected to at least one of the one or more valves with one or more water tubes. The at least one washing nozzle can be positioned for directing water to the one or more body parts of the user. The apparatus can also include a protective shield gate covering at least a portion of the at least one washing nozzle, where the protective shield gate is rotatably coupled to the bidet washing apparatus.

According to various embodiments, the protective shield gate can be rotatably coupled to the apparatus along a side or top edge via a hinge, for example, in order to allow for the manual or electrical opening and closing of the protective shield gate. In this manner, the nozzle(s) are easily accessible for cleaning, removal, replacement or other adjustment while the protective shield gate is open. In an alternative embodiment, the protective shield gate can be completely removed to similarly provide access to the nozzle(s).

According to another embodiment, the water inlet(s) can be fluidically connected to one or more valves via a single-body connector without any intervening parts or joints, which results in a more robust, long-lasting, bidet washing apparatus, since leaks or other damage to the fluidic couplings are less likely to occur.

Figure 2:
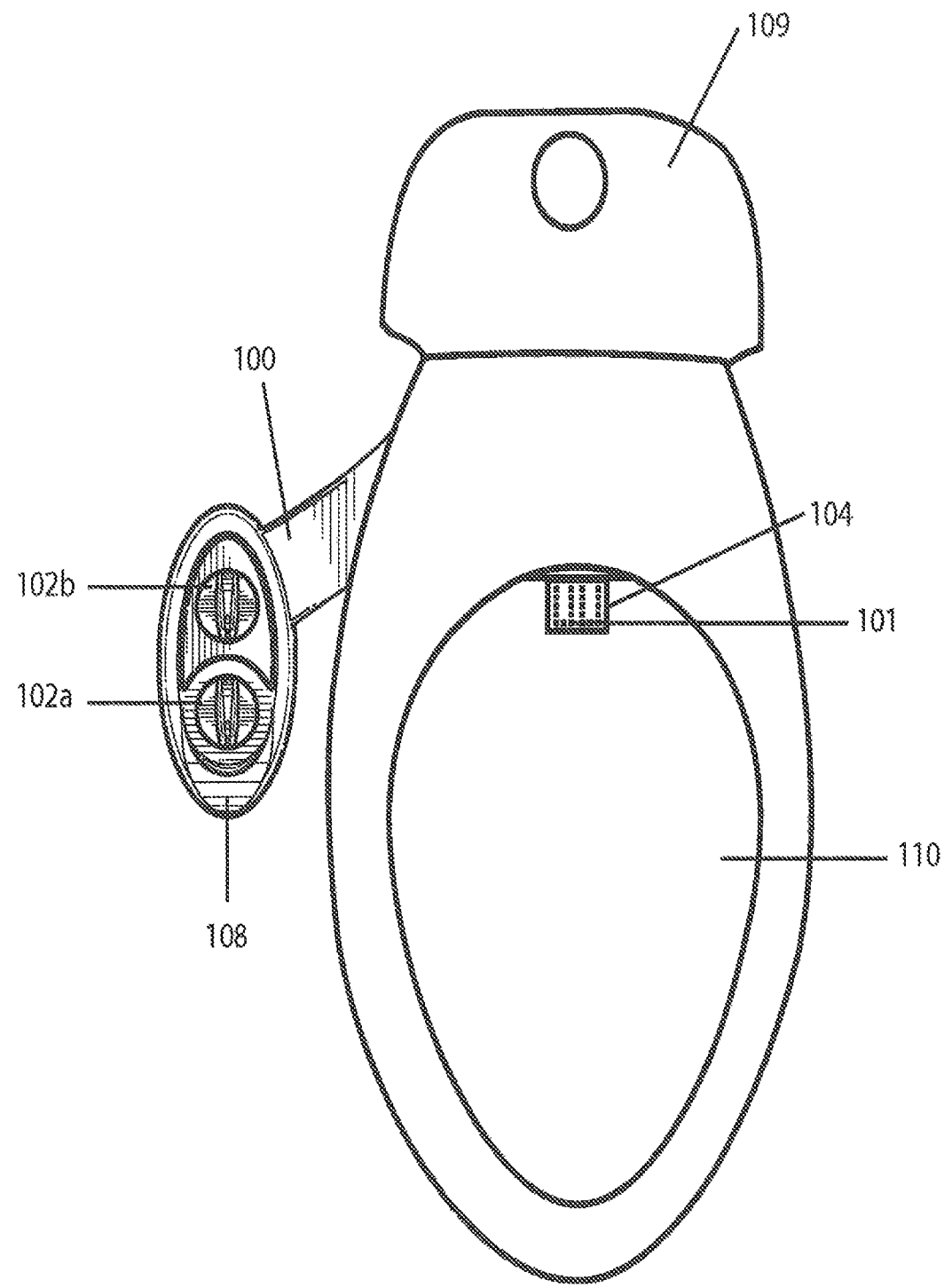
FIG. 2 illustrates an embodiment of a perspective view of a bidet washing apparatus installed on an existing toilet seat, with the seat cover down.

Referring to FIG. 1 and FIG. 2, the bidet washing apparatus 100 of the disclosure can be mounted on a toilet bowl 110 using securing mechanism 105a and 105b. Any conventional securing unit can be implemented, e.g., one or more screws. A seat (not shown) can pivot around and can be connected to a rear portion of the toilet bowl 110. On the rear portion of the toilet bowl 110 can be mounted a refillable toilet tank 109, in which an amount of water can be stored. In certain embodiments, the toilet tank 109 can be used as the water source for the bidet washing apparatus 100 by a fluidic connection. On the bidet washing apparatus 100 can be mounted a nozzle assembly 101, which includes at least one washing nozzle (not shown) for washing the body parts of the user sitting on or near the toilet bowl 110. The body of bidet washing apparatus can be made of any suitable material, including but not limited to, plastics, polymers, reinforced polymeric materials, wood, metal and the like, and any combination thereof.

Figure 3:
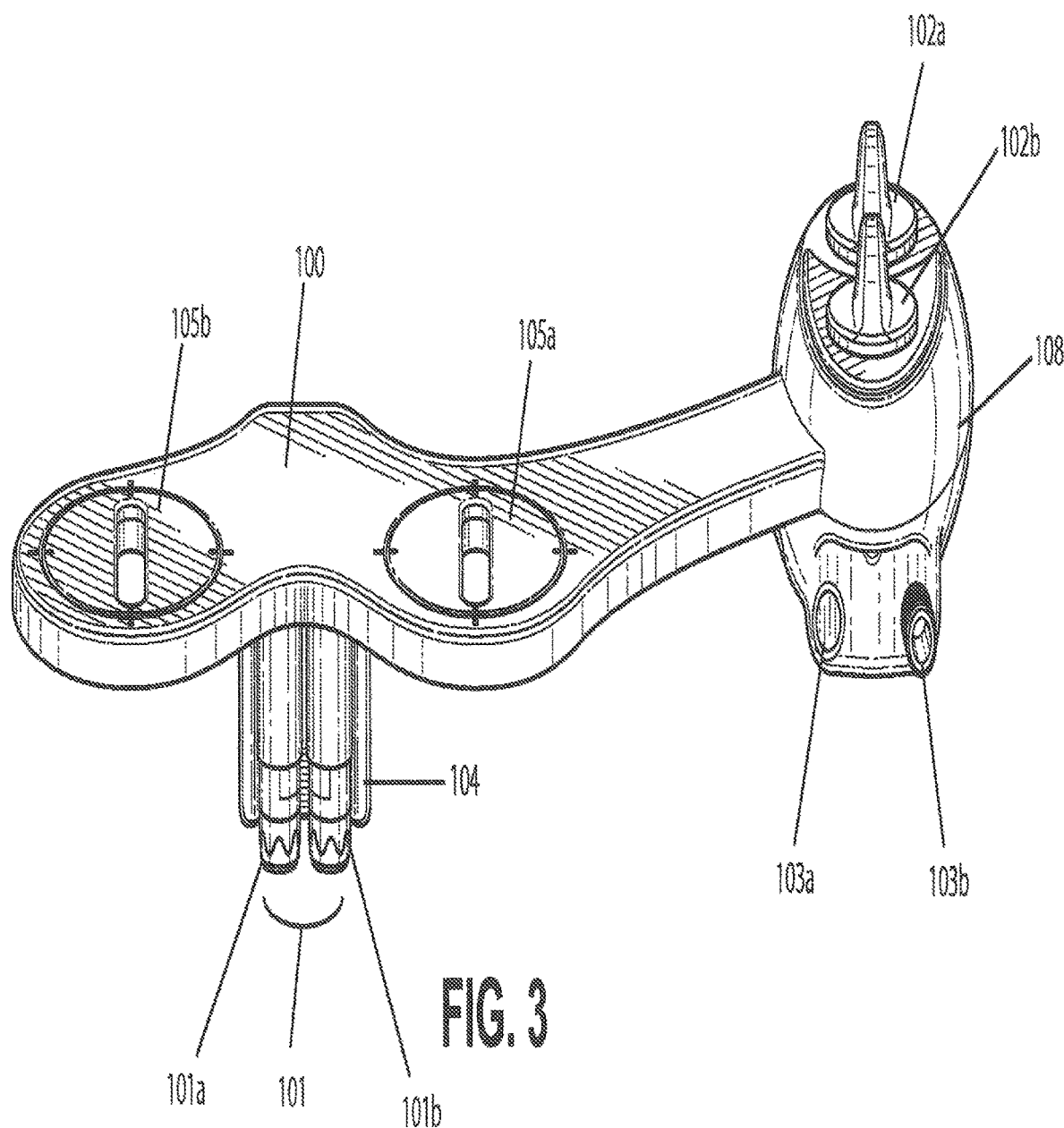
FIG. 3 illustrates an embodiment of a perspective view of an exemplary bidet washing apparatus.

FIG. 3 shows one exemplary embodiment of a bidet washing apparatus 100 with two washing nozzles 101a and 101b, respectively. However, in an installation a lesser or greater number of nozzles can be used. Each washing nozzle can spray a stream of water upwardly and inwardly, according to various embodiments.

As shown in FIG. 2 and FIG. 3, a control unit 108 can be provided for easy access for the user, and houses control switches 102a and 102b for providing operational instructions to the bidet washing apparatus 100. The depicted example shows two switches 102a and 102b; however, one of ordinary skill in the art would realize that any number of switches can be provided for performing various operations without departing from the scope of the disclosure. Some examples of operational instructions include, but are not limited to, controlling the flow of water from the water inlet, changing the angle of the washing nozzles, and opening and closing the protective shield gate (described in further detail below). The type of control switches can be selected from a group including knobs, dials, levers, and depressible buttons, or any conventional control mechanism. An installation may have all similar control switches where both control switches 102a and 102b an knobs.

Figure 9:
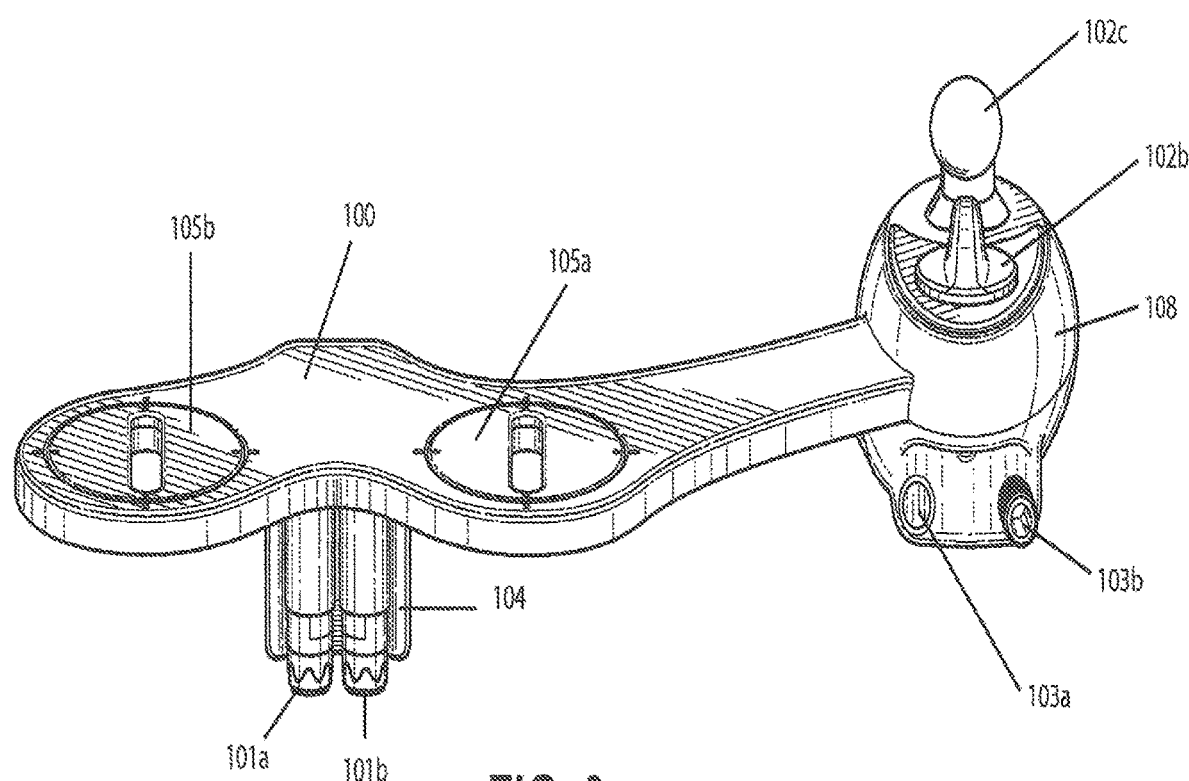
FIG. 9 illustrates an embodiment of a perspective view of an exemplary bidet washing apparatus.

On the other hand, FIG. 9 shows an embodiment of the disclosure where one of the control switches 102b is a knob and the other control switch 102c is a lever.

Furthermore, as shown in FIG. 1 and FIG. 2, the nozzle assembly 101 can have a protective shield gate 104 substantially or partially in front of it. The position of the protective shield gate 104 is such that it can act as a shield between the user's body and/or water in the toilet bowl 110 and the nozzle assembly 101 thus protecting the nozzle assembly 101 from pollutants during use.

Certain aspects of the bidet washing apparatus will be detailed hereinafter with reference to FIGS. 3-9.

FIG. 3 shows a front perspective view of one embodiment described herein. Referring to FIG. 3, the bidet washing apparatus 100 includes the water inlets 103a and 103b to feed water into the bidet. The water inlet can be controlled by the user using the control switches 102a and 102b situated on the control panel 108. The water from the water inlets 103a and 103b can be ultimately provided to the nozzle assembly 101 via tubes (as described in greater detail with reference to FIG. 7, for example). The nozzle assembly shown in this aspect of the disclosure has two washing nozzles 101a and 101b. The protective shield gate 104 protects the nozzle assembly 101 from excrement and pollutants as described above. In this example, the protective shield gate 104 is positioned in front of the nozzle assembly 101 of the bidet such that it is between the user sitting on the toilet seat, for example, and the nozzle assembly. Hence, when the user is using the toilet, the nozzles are shielded behind the shield gate 104 and do not become polluted.

Figure 5:
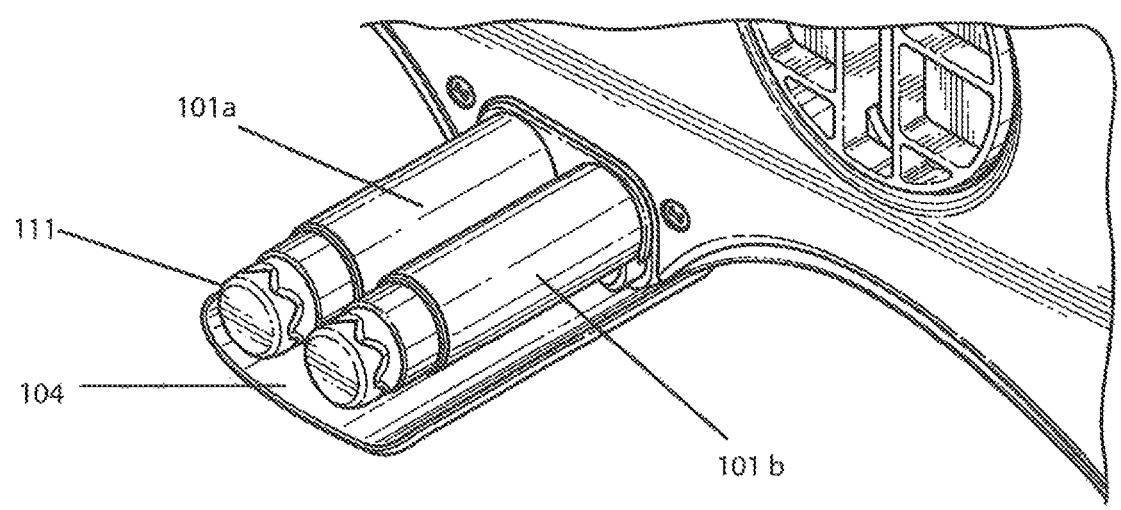
FIG. 5 illustrates an embodiment of a fragmentary view of an exemplary bidet washing apparatus illustrating the gate shield protecting the nozzle assembly in a closed position.
Figure 6:
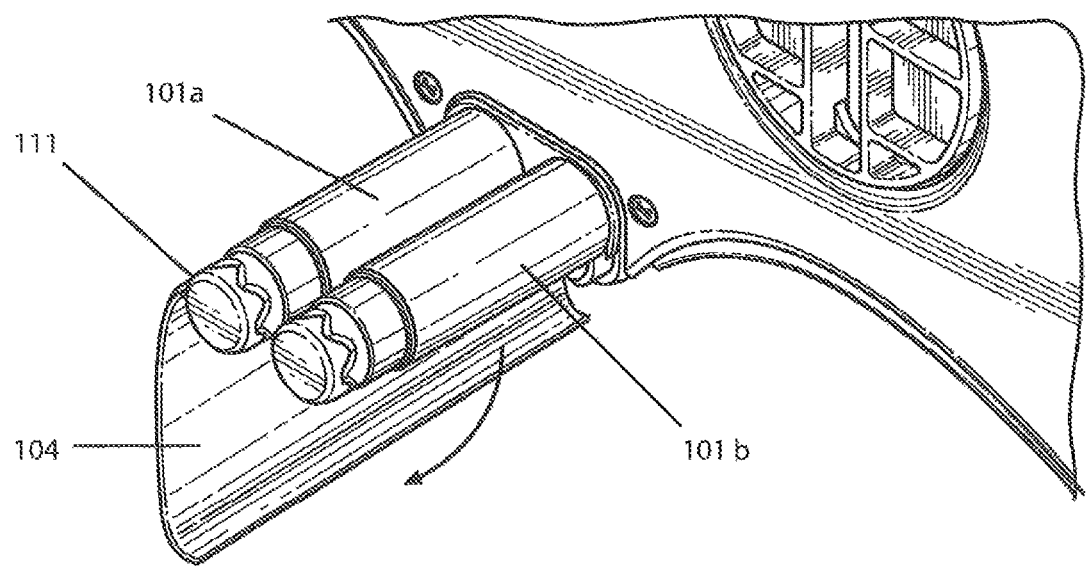
FIG. 6 illustrates an embodiment of a fragmentary view of an exemplary bidet washing apparatus illustrating the shield gate protecting the nozzle assembly in an open position.

Referring to FIGS. 5-6, the protective shield gate 104 can be movable along a hinged edge 111 to provide for further hygiene. The protecting shield gate 104 rotates and thus can be manually, for example, opened (FIG. 6) and closed (FIG. 5), after using the toilet to clean any minute left over pollutants on the outer covering of the nozzle assembly to ensure complete cleanliness. In the embodiment, the user can open and close the gate manually and, thus, the gate can stay in the opened or closed position that the user places the gate. In certain embodiments, the gate can be opened acid closed by an electrical signal using a control switch located on the control panel 108, which can allow the gate to remain open until the user closes the gate via the control switch, so the user can clean the nozzle. In other embodiments, the hinged edge 111 is on the top of the protective shield gate 104, and not on the side edge as shown in the illustrative FIGS. 5-6. In yet other embodiments, the user may be able to completely remove the protective shield gate 104 for cleaning the nozzle(s), and reattach it after cleaning. Of course, one of ordinary skill in the art would understand that the hinged edge could comprise any rotatable joint mechanism that allows for the rotation of the gate 104 to provide efficient access to the nozzle(s). If the gate 104 is completely removable, a grooved and slideable mechanism can be employed so that the gate 104 can slide in and out to be attached and removed. Of course, other mechanisms can be utilized for removably attaching the gate 104, e.g., a magnet or a snap structure.

In certain embodiments, the protective shield gate 104 has a flap portion perpendicular to the shield gate 104 such that it covers the bottom of the nozzle assembly 101. Additionally, the flap can have a spring mechanism such that it is pushed out and aligns with the shield gate 104 by the force of the water stream when water flows out of the nozzle assembly 101. When the water flow stops, the flap can spring back into its original position perpendicular to the shield gate 101.

The protective shield gate 104 of the disclosure can be made from a material selected from plastic, metal, material having anti-microbial properties, and material with increased pollutant repellant properties.

In certain embodiments, the angle of the washing nozzles can be adjusted using control switch(es) located on the control unit 108. Thus, when a user wants to clean certain body parts, water can be sprayed on a desired body part by adjusting the angle of the washing nozzle(s). As shown in FIG. 3, the height of the protective shield gate is such that it allows for an uninterrupted spray of water from the nozzle assembly 101, since the nozzle assembly 101 can extend beyond the bottom edge of the gate 104.

Figure 4:
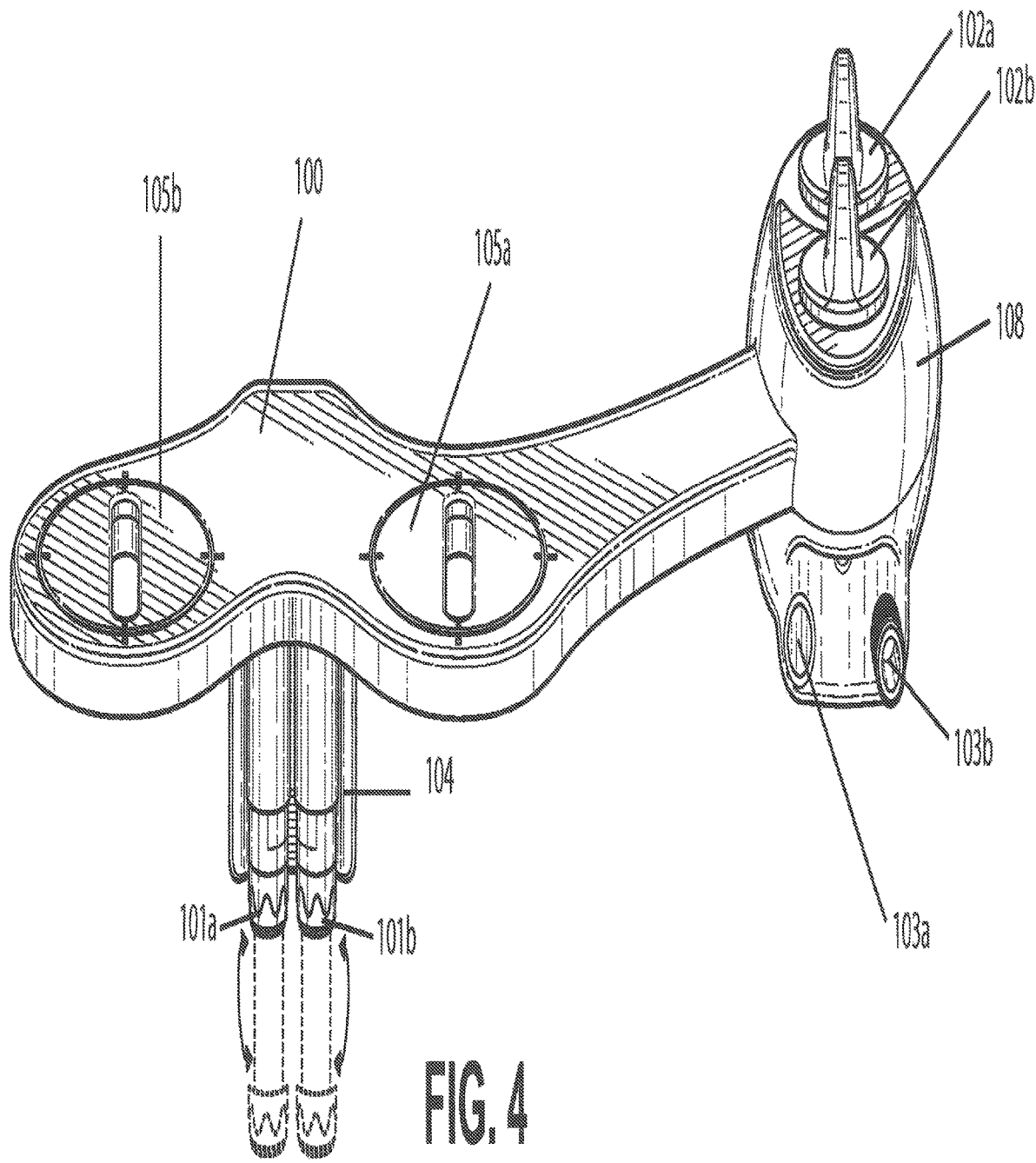
FIG. 4 illustrates an embodiment of a perspective view of an exemplary bidet washing apparatus, with the dotted lines showing the nozzles extended outwards.

FIG. 4 shows another embodiment wherein the height the protective shield gate is equal to or greater than that of the washing nozzles 101a and 101b. Here, the washing nozzles 101a and 101b are housed within an outer covering including a spring mechanism for pushing the washing nozzles out when water flows through the washing nozzles such that the water flow is not interrupted by the protective shield gate 104. Each washing nozzle includes an outer covering and an inner nozzle operated slidably back and forth with hydraulic pressure of the supplied washing water in accordance with an instruction from the control unit 108. During use of the washing nozzles, the nozzles are extended from their outer covering below the length of the shield gate by the hydraulic force of the washing water and water is sprayed on the user for cleaning purposes. After use, when the water flow is stopped, the nozzles are retracted in their outer covering which is hidden behind the shield gate. In certain other embodiments, the user may control the movement of the washing nozzle by using the control unit 108, instead of the hydraulic pressure. When an instruction of a washing operation is given by the control unit 108, a washing nozzle driving unit is activated to advance the nozzle. The washing nozzle angle can also be adjusted by an instruction given by the control unit 108 to position the nozzle for cleaning. Thus, the washing nozzle can reach the user's desired washing position by the combined advancement of the nozzle and/or the angular positioning.

According to the embodiment, the nozzle assembly 101 includes at least one washing nozzle. In yet another embodiment, the bidet washing apparatus 100 further includes a self-cleaning nozzle for cleaning the nozzle assembly itself. The self-cleaning nozzle can be positioned to spray water onto the nozzle assembly 100 and/or washing nozzle(s) before and/or after usage for additional hygiene. The self-cleaning nozzle can be adapted to be controlled by the control unit 108, and thus provides an additional hygiene level.

Another embodiment includes a toilet cleaning nozzle for cleaning the toilet and the bidet before and after use of the toilet. The toilet cleaning nozzle can be positioned to spray water on the toilet bowl 110 and/or the bidet apparatus 100, and can be controlled by the control unit to provide additional hygiene. Yet, another embodiment includes a shield cleaning nozzle for cleaning the protective shield gate 104. The shield cleaning nozzle can be similarly controlled by the control unit 108. Additionally, the shield cleaning nozzle can be positioned to clean the shield gate 104 in an open and/or closed position.

Any or all of the washing nozzles can be connected to the nozzle assembly 101 via a ball joint, for example, which could allow the user to manually swivel a washing nozzle around 360 degrees, in order to direct the spray of water in a desired and precise direction. Of course, other types of joints and connectors could be implemented in order to allow for the manual swivel or direction correction, as desired by the user to spray water to a desired body part, for example.

Moreover, according to an exemplary embodiment, one or more of the washing nozzle(s) 101a and 101b can be connected to the nozzle assembly 101 by a mechanism allowing for the easy removal of the nozzle(s) 101a and 101b. For example, the washing nozzles) 101a and 101b can slide into place via a grooved portion of the nozzle assembly 101, or could otherwise snap into place. Any conventional mechanism of removably attaching the nozzle(s) 101a and 101b can be implemented, so that the user can swap the nozzle(s) 101a and 101b with other nozzles or increase or reduce the number of washing nozzle(s) 101a and 101b connected to the nozzle assembly 101.

Figure 7:
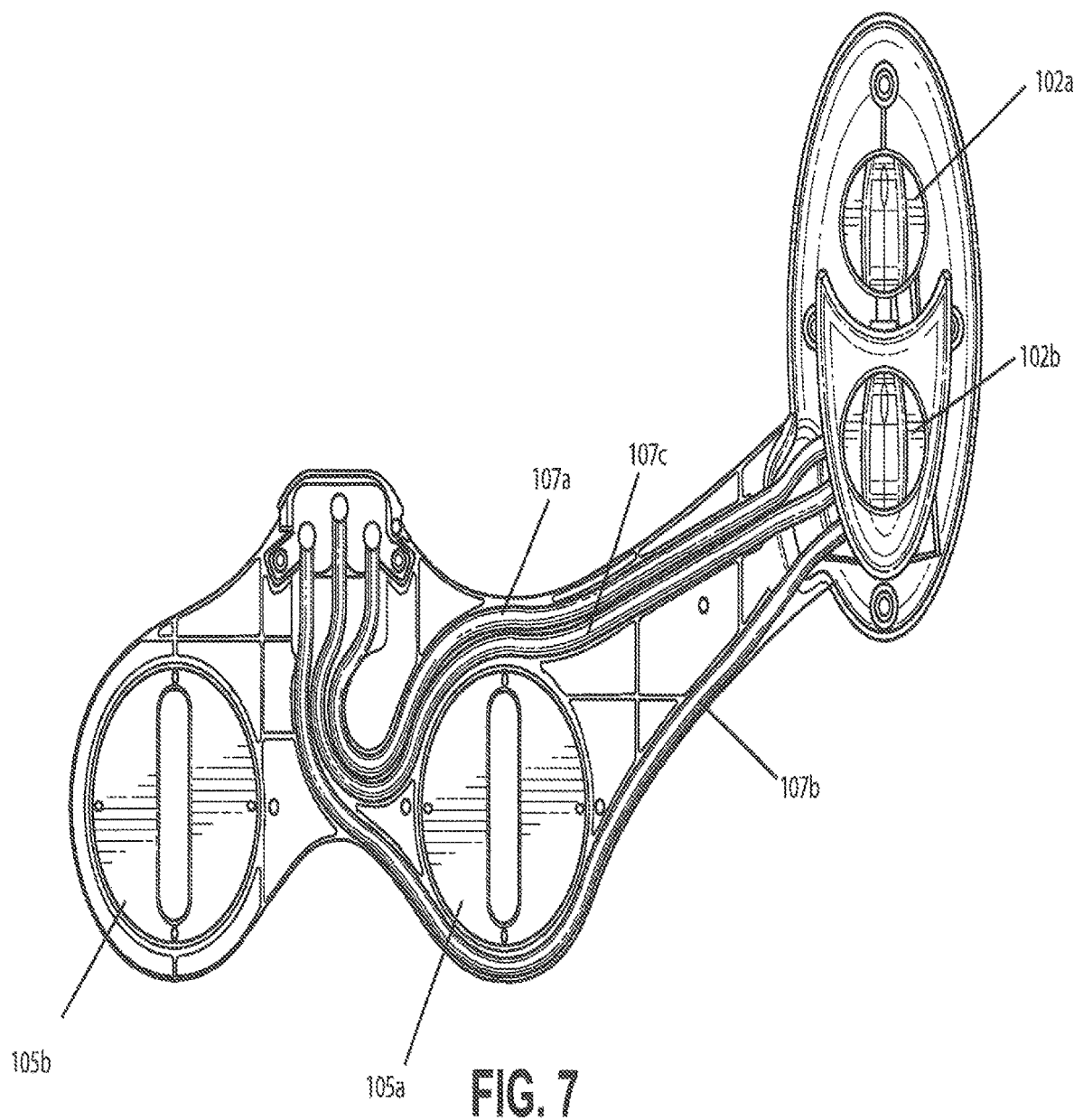
FIG. 7 illustrates an embodiment of a top plan view of the exemplary embodiment.
Figure 8:
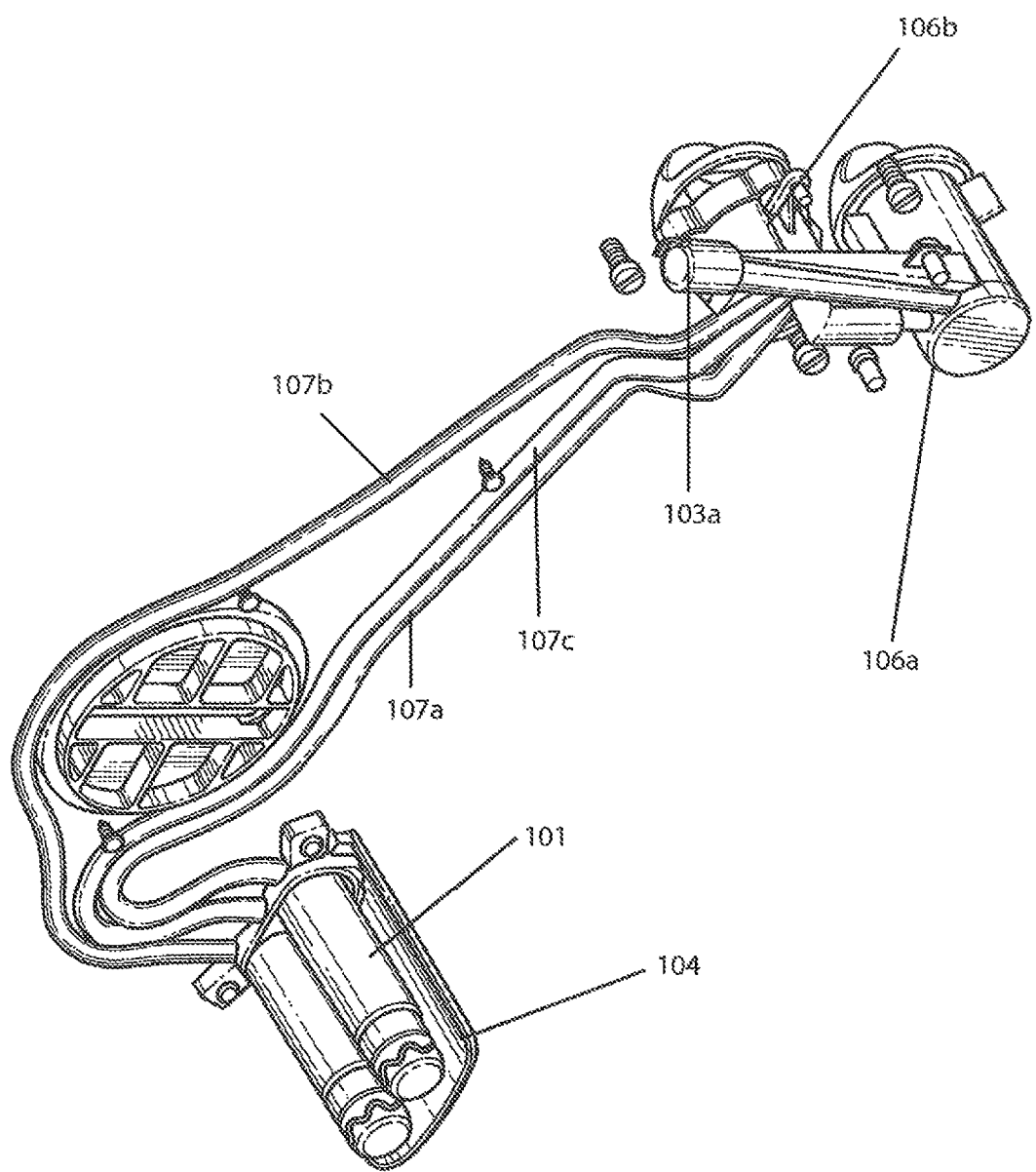
FIG. 8 illustrates an embodiment of a bottom plan view of a perspective view of a bidet washing apparatus.

An exemplary water supply system to the nozzle assembly 101 will be detailed hereinafter with reference to FIGS. 7-8. The control unit 108 can house the control valves 106a and 106b (as shown in FIG. 8), to control the flow of water to the water tubes and has the control switches 102a and 102b, for giving instructions to the control valves. Two control valves and control switches are depicted for exemplary purposes, but it should be understood that any number of control valves and corresponding switches can be employed.

The control valves 106a and 106b can be situated at the entrance to the water tubes 107a-107c in this example. The control valves 106a and 106b are designed to open, close or partially obstruct the water inlet 103 opening into the water tubes 107a, 107b and 107c, such that the volume of the water flowing through the any tube at any given time can be easily controlled by the user by giving simple instructions thorough the control switches. The water tubes 107a-107c connect the control valves 106a-106b at one end to the nozzle assembly 101 at the other end. Thus, the control valves 106a-106b can effectively control the volume of water flowing to the nozzle assembly 101. In the embodiment, one water tube 107b passes through the back of the bidet 100, and two water tubes 107a and 107c pass through the front of the bidet 100. However, it is to be noted that in an embodiment, more than one water tube could pass through the back of the bidet 100, and the number of water tubes passing through the front of the bidet 100 could be more or less than two.

According to an embodiment, the bidet washing apparatus 100 can include a vacuum breaker (not depicted), which can be situated at various locations within the bidet washing apparatus 100. The vacuum breaker can be located anywhere between the water supply (e.g., the water tank supplying water to the toilet bowl) and the washing nozzle(s) (e.g., 101a-101b) output. The vacuum breaker can be intended to halt the flow of water that is not expelled by the washing nozzle(s) back into the water supply. According to one exemplary embodiment, the vacuum breaker(s) can be housed within the control unit 108, located between a valve 106a-106b and the nozzle assembly 101; however, one of ordinary skill in the art would realize that various locations of one or more vacuum breakers can be implemented within the scope of this disclosure to perform the desired function.

Figure 10:
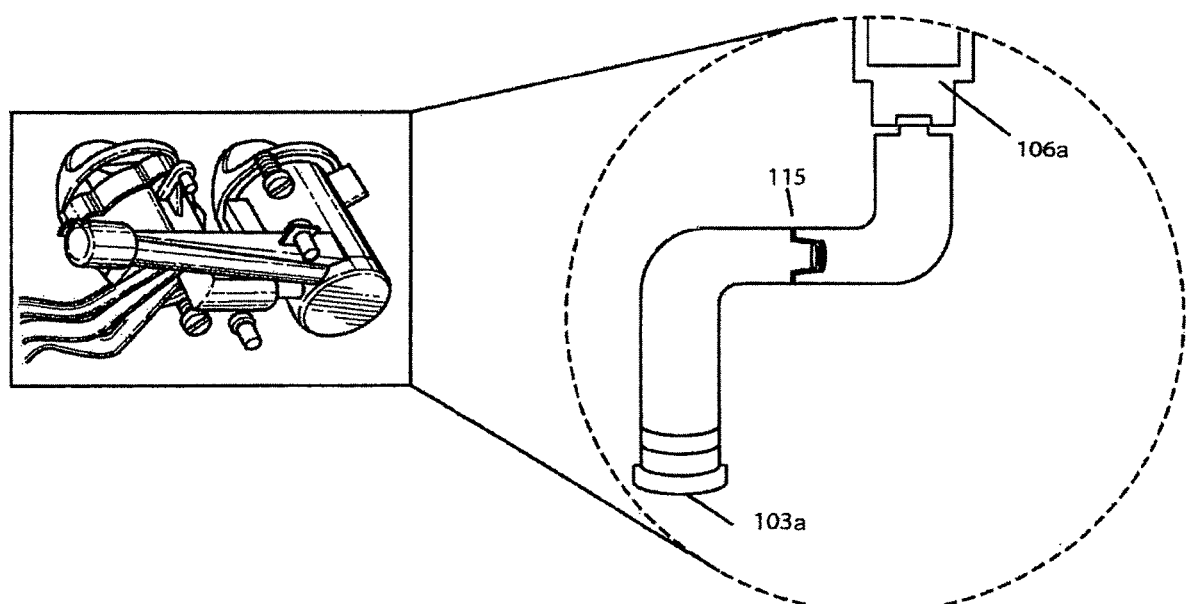
FIG. 10 illustrates an embodiment of a schematic showing a single connection between a water inlet and a control valve inside a control panel.

In one exemplary embodiment, each water inlet 103a-103b is connected to a control valve 106a-106b by a single, non-jointed, connection 115 (see FIG. 10) thereby removing any intervening parts and extra connections, which can considerably increase the durability and lifetime of the bidet system. Of course, multiple water inlets 103a-103b could be connected to a single control valve; however, each connection between the water inlets 103a-103b and the single control valve can be a single-body structure, according to one embodiment.

In an embodiment, the washing nozzle can be replaced with a nozzle that is configured to hold materials such as soap, disinfectant or any cleaning or medicinal substance that can be expelled along with water as it flows through the nozzle. For example, such materials could be in a solid, semi-solid or liquid form, which dissolves at a predetermined and desired rate, as the water flows through the nozzle and is carried out of the nozzle by the spraying water.

In another embodiment, the bidet washing apparatus can contain one or more reservoir dispensers or chambers, which can be configured to hold materials such as soap, disinfectant or any cleaning or medicinal substance that can be expelled along with water through one or more water tubes to the nozzle assembly and can be carried out of one or more nozzles by the spraying water. As before, the above-mentioned materials are provided merely for exemplary purposes and are not intended to limit the disclosure in any way. Other known substances and/or materials could be held and/or stored in a nozzle or reservoir dispenser in order to be expelled with water through the nozzle.

Figure 11:
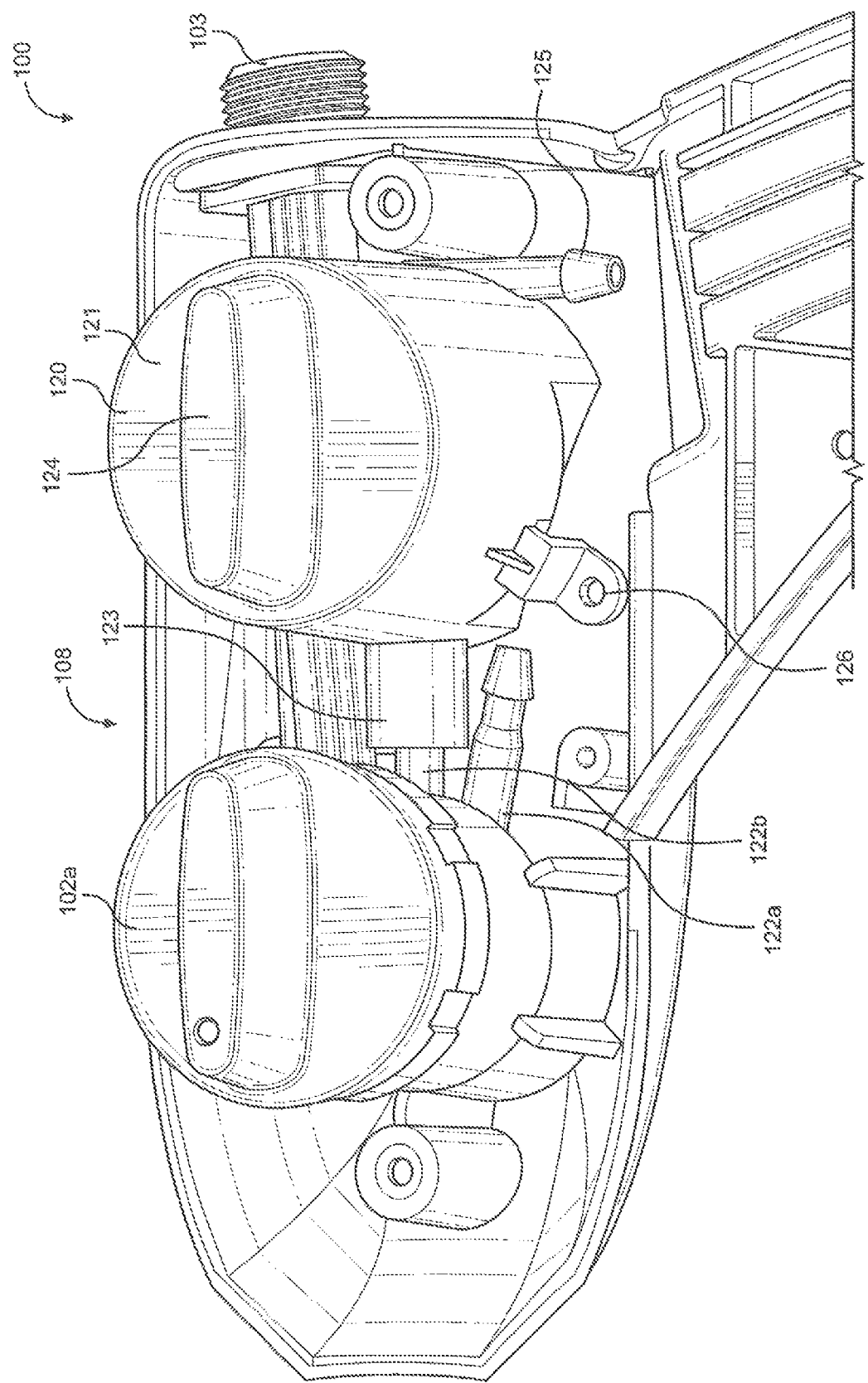
FIG. 11 illustrates a cut-away view of an embodiment of a top view of a bidet washing apparatus.

FIG. 11 illustrates a cut-away of an embodiment of a top view of a bidet washing apparatus 100, i.e., without showing the entire body of the apparatus. In this figure, the apparatus includes water inlet 103a, which is fluidically connected to control unit 108 to supply water. The control unit includes control unit switch 102a, which is configured to operate one or more control unit valves or openings (not shown) for controlling water flow from the water inlet and from control unit outlets 122a and 122b.

As shown in this figure, the apparatus also includes a reservoir dispenser 120 having one or more compartments (not shown) with a removable lid or cap 121 for holding soap and/or disinfectant. The control unit outlets, 122a and 122b, allow for transfer of water from the control unit to the nozzle assembly 101 via water tube 107a and/or 107c (see FIGS. 3-9); and to the reservoir dispenser 120 via reservoir dispenser inlet 123, respectively.

The reservoir dispenser 120 allows for mixing of the transferred water with the soap and/or disinfectant present in the one or more compartments of the dispenser to provide a soapy and/or a disinfectant solution or mixture. The reservoir dispenser 120 includes reservoir dispenser switch 124, which is configured to operate one or more reservoir dispenser valves or openings (not shown) for controlling water flow from the control unit and/or from reservoir dispenser outlet 125.

Once mixed together, the solution or mixture in the one or more compartments of the reservoir dispenser 124 can be transferred through the reservoir dispenser outlet 125 to the nozzle assembly 101 via water tube 107a, 107b or 107c (see FIGS. 3-9), and provide the solution or mixture for washing and cleaning the nozzle assembly and shield gate.

Also shown in this figure is a plurality of tabs with openings 126, which can be used as a securing mechanism for securing the control unit and reservoir dispenser to the body of the apparatus using screws, bolts, or snaps, and the like.

Figure 12:
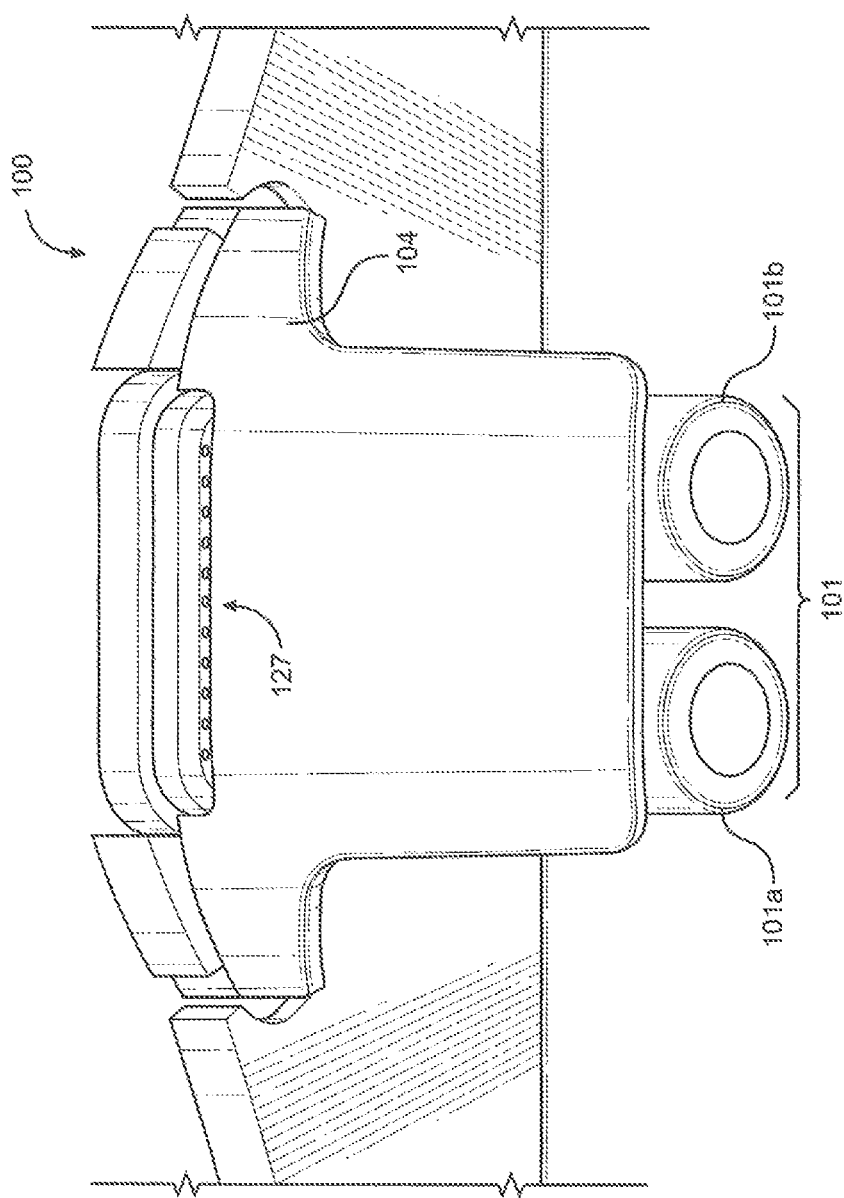
FIG. 12 illustrates a cut-away view of an embodiment of a bottom view of a bidet washing apparatus, showing nozzle assembly including washing nozzles and a shield gate.

FIG. 12 illustrates a cut-away view of an embodiment of a bottom view of a bidet washing apparatus 100, showing nozzle assembly 101 including washing nozzles 101a and 101b, and shield gate 104. This figure also illustrates one or more openings 127 located above the assembly, which allow the solution or mixture transferred through water tube 107a, 107b or 107c to wash and/or clean the nozzle assembly and shield gate.

Figure 13A:
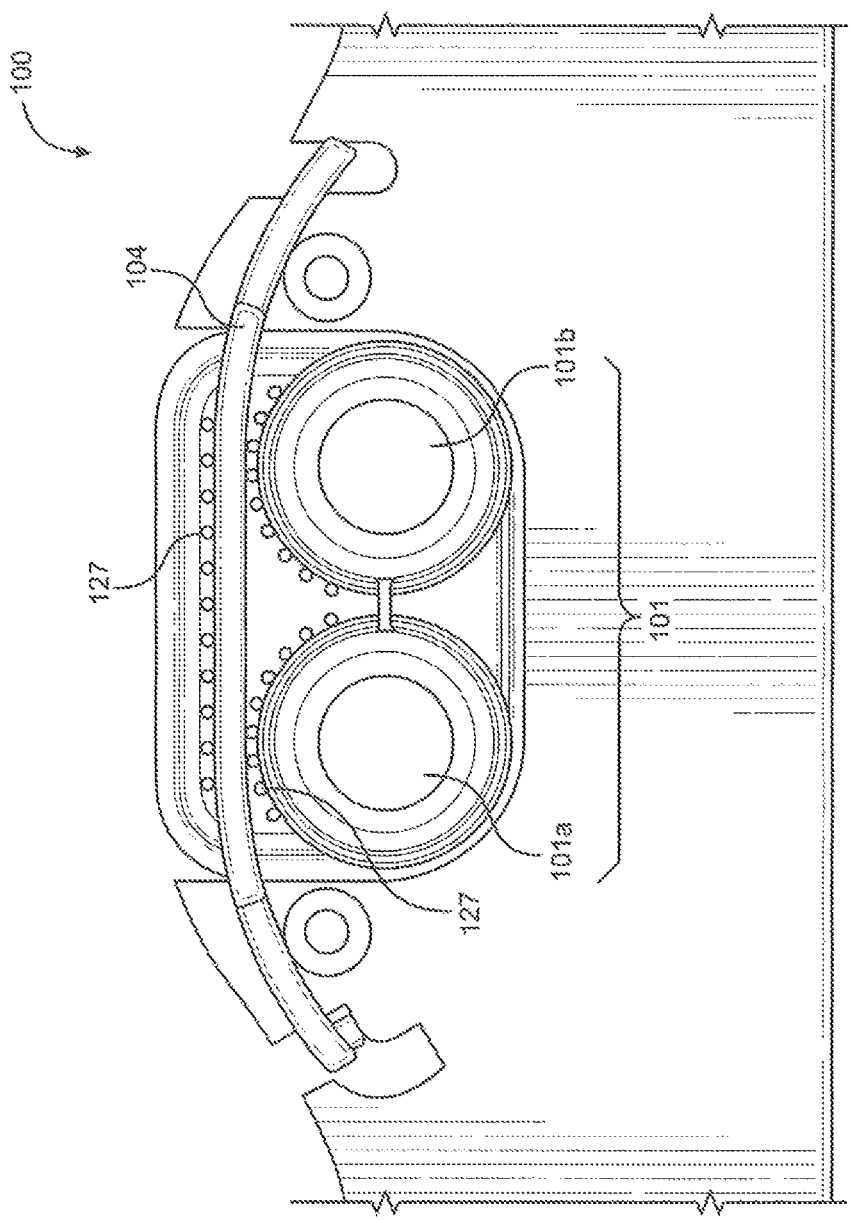

FIGS. 13a and 13b illustrate a cut-away view of an embodiment of a bottom view of the nozzle assembly 101, washing nozzles 101a and 101b, and the one or more openings 127 with and without the shield gate 104, respectively. As shown in these figures, the one or more openings can be configured to wash one or both sides of the shield gate.

Figure 14:
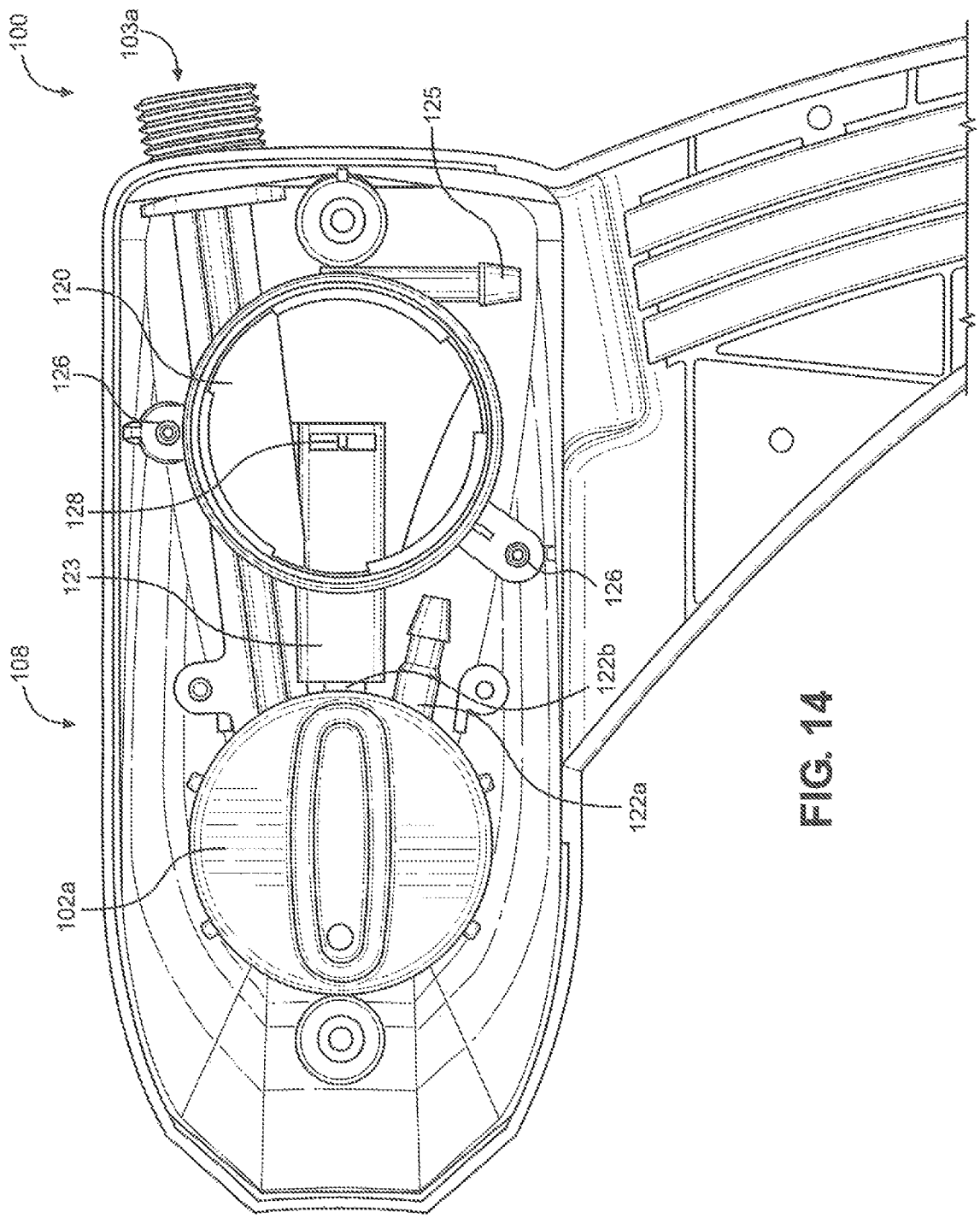
FIG. 14 illustrates a cut-away view of an embodiment of a top view of a bidet washing apparatus, showing a one compartment reservoir dispenser with the lid or cap removed.

FIG. 14 illustrates a cut-away view of an embodiment of a top view of a bidet washing apparatus 100, showing a one compartment reservoir dispenser 120 with the lid or cap removed.

As shown in this figure, inside the reservoir dispenser 120 is an opening 128 in the reservoir dispenser inlet 123, which allows for flow of water from the control unit switch 102a into the compartment of the reservoir dispenser.

Also shown in this figure is the water inlet 103a, control unit 108, control unit outlets 122a and 122b, reservoir dispenser inlet 123 reservoir dispenser outlet 125, and securing mechanisms 126.

Figure 15:
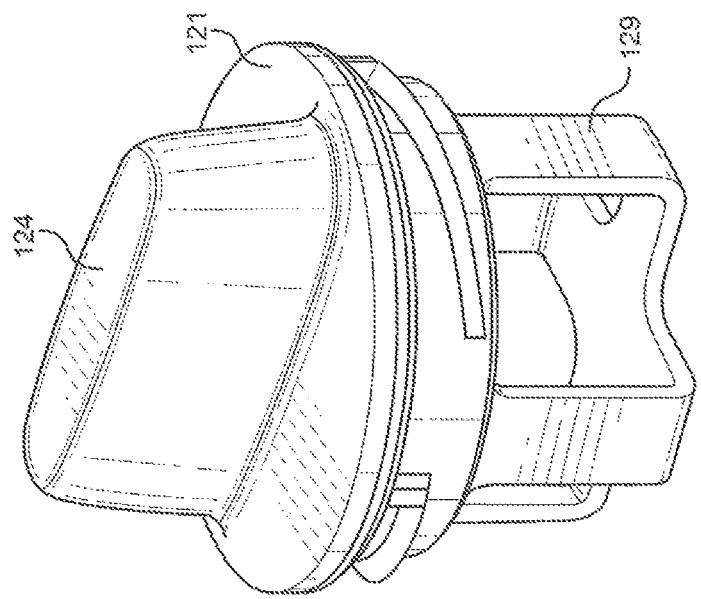
FIG. 15 illustrates a view of the lid or cap, which can be removably attached to the reservoir dispenser.

FIG. 15 illustrates a view of the lid or cap 121, which can be removably attached to the reservoir dispenser. The lid or cap 121 can include the reservoir dispenser switch 124 and a lower securing gate 129 for securing cleaning and/or disinfection materials in a solid or tablet form. Alternatively, the lower securing gate can include one or more filters or screens for securing the cleaning material, which can allow water to flow over the cleaning and/or disinfection materials to provide the desired solution.

The reservoir dispenser and lid can be of any type of complimentary securing device to make up the dispenser, e.g. a threaded dispenser and screw-on lid, a dispenser with a snap-on lid, etc. In addition, the dispenser and/or lid can include one or more washers or O-rings (not shown), or any other similar type of device for securing a water-tight seal between the dispenser and lid.

Figure 16:
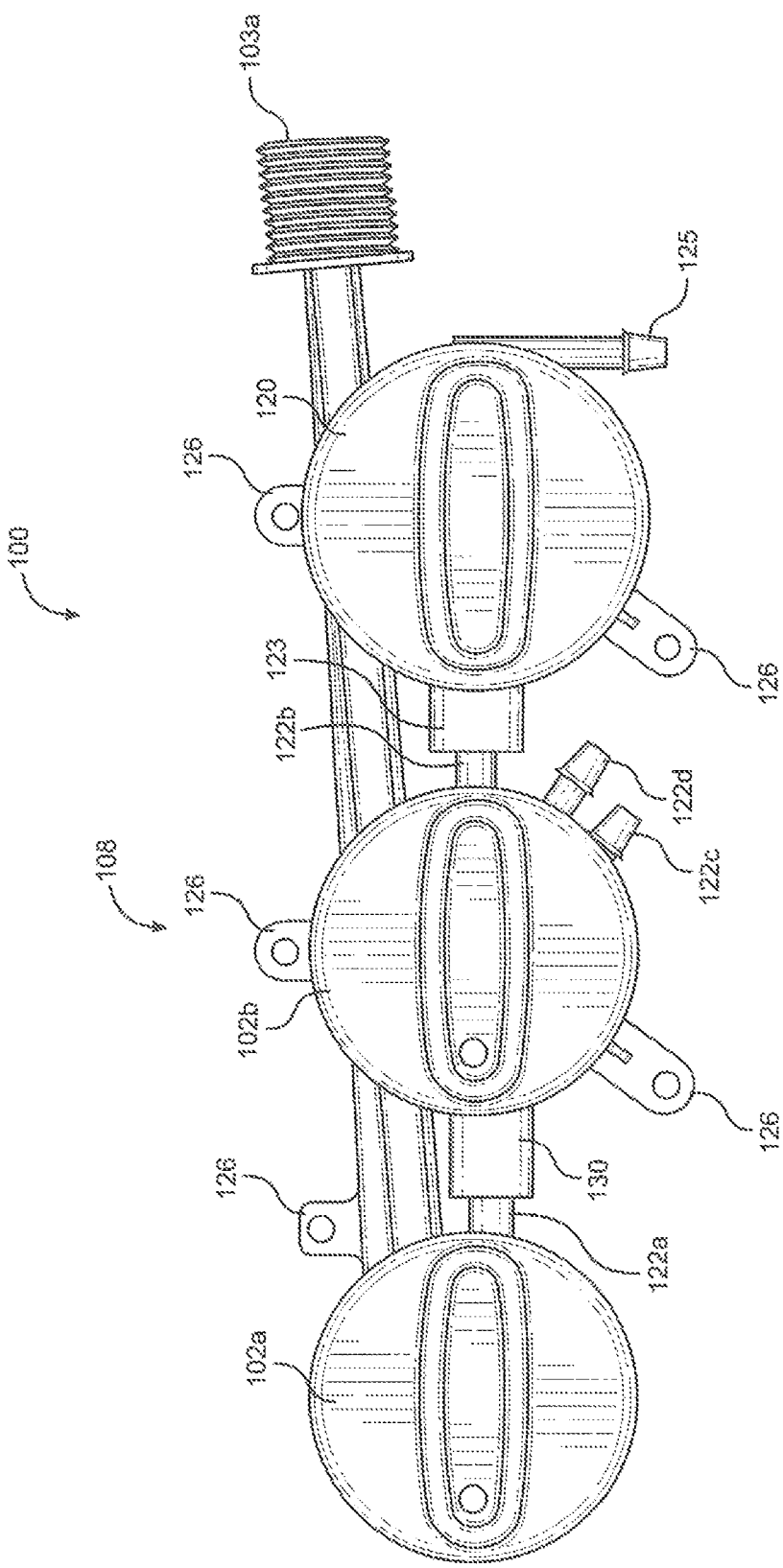
FIG. 16 illustrates a cut-away view of an embodiment of a bidet washing apparatus with a reservoir dispenser and a removable lid or cap.

FIG. 16 illustrates a cut-away view of an embodiment of a bidet washing apparatus 100 with a reservoir dispenser 120 and a removable lid or cap 121. In this figure, the apparatus includes water inlet 103a connected to control unit 108 having control switch 102a. The first control switch can act as an on/off switch for the incoming and out-going water. In the on position, water can be transferred from the first control switch to control switch 102b via water outlet 122a and water inlet 130. Control switch 102b includes two water outlets 122c and 122d for transferring water to the nozzle assembly 101 via water tubes 107a, 107b or 107c. Control switch 102b also includes a water outlet 122b (not shown) for transferring water to the reservoir dispenser 120 via reservoir dispenser inlet 123. Ultimately, the resulting solution or mixture in the reservoir dispenser can be transferred to nozzle assembly 101 for cleaning purposes via reservoir dispenser outlet 125 and water tube 107a, 107b or 107c (not shown).

Figure 17:
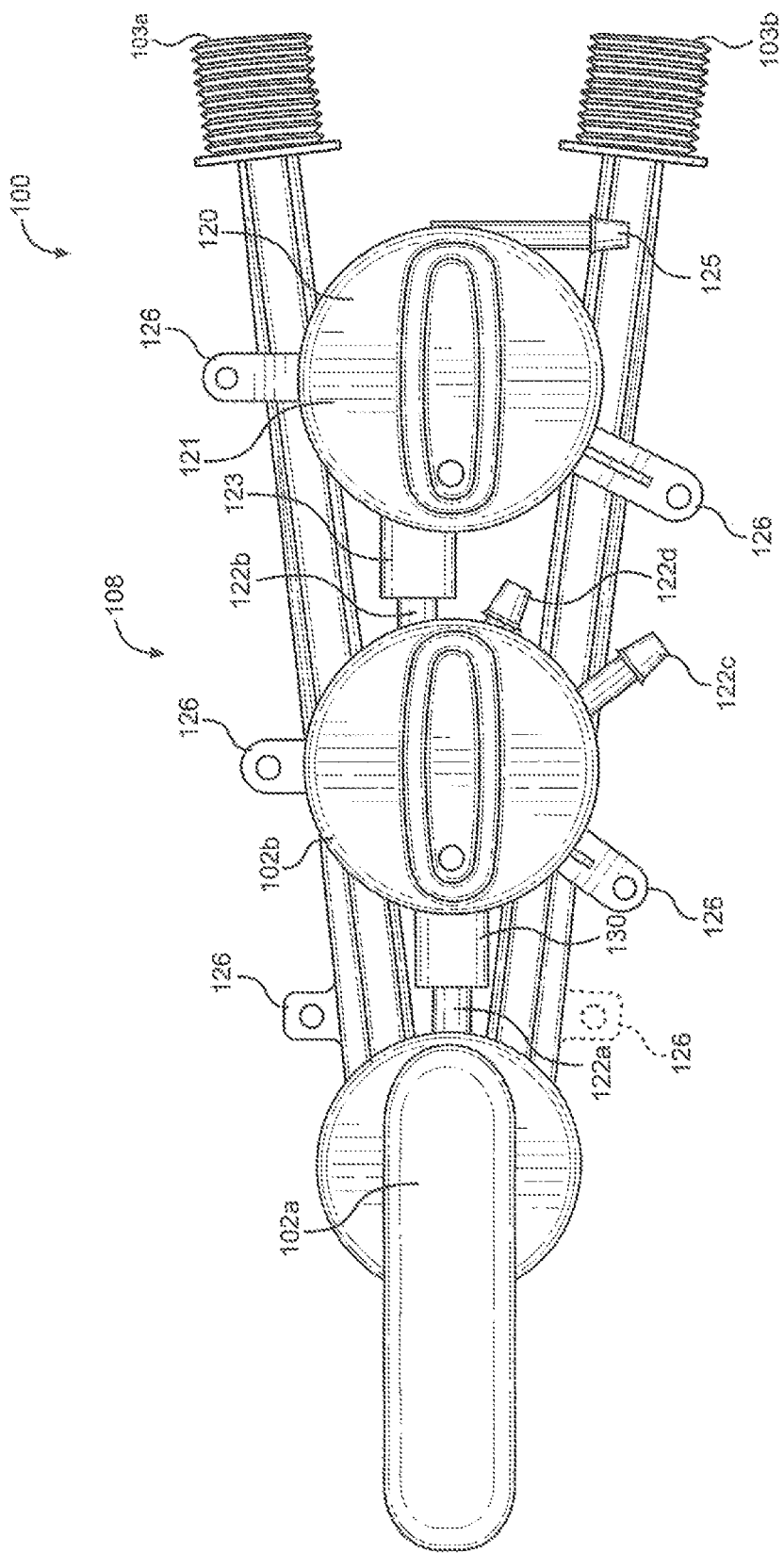
FIG. 17 illustrates a cut-away view of an embodiment of a bidet washing apparatus with a reservoir dispenser and a removable lid or cap.

FIG. 17 illustrates a cut-away view of an embodiment of a bidet washing apparatus 100 with a reservoir dispenser 120 and a removable lid or cap 121. In this figure, the apparatus includes separate water inlets 103a and 103b, which can be used for transporting cold and/or hot water to the control switch 102a. The apparatus also includes water inlet 103a connected to control unit 108 having control switch 102a, which can be configured as a handle or lever. As before, the first control switch can act as an on/off switch for the incoming and out-going water. In the on position, water can be transferred from the first control switch to control switch 102b via water outlet 122a and water inlet 130. Control switch 102b includes two water outlets 122c and 122d for transferring water to the nozzle assembly 101 via water tubes 107a, 107b or 107c. Control switch 102b also includes a water outlet 122b (not shown) for transferring water to the reservoir dispenser 120 via reservoir dispenser inlet 123. Ultimately, the resulting solution or mixture in the reservoir dispenser can be transferred to nozzle assembly 101 for cleaning purposes via reservoir dispenser outlet 125 and water tube 107a, 107b or 107c (not shown).

Figure 18:
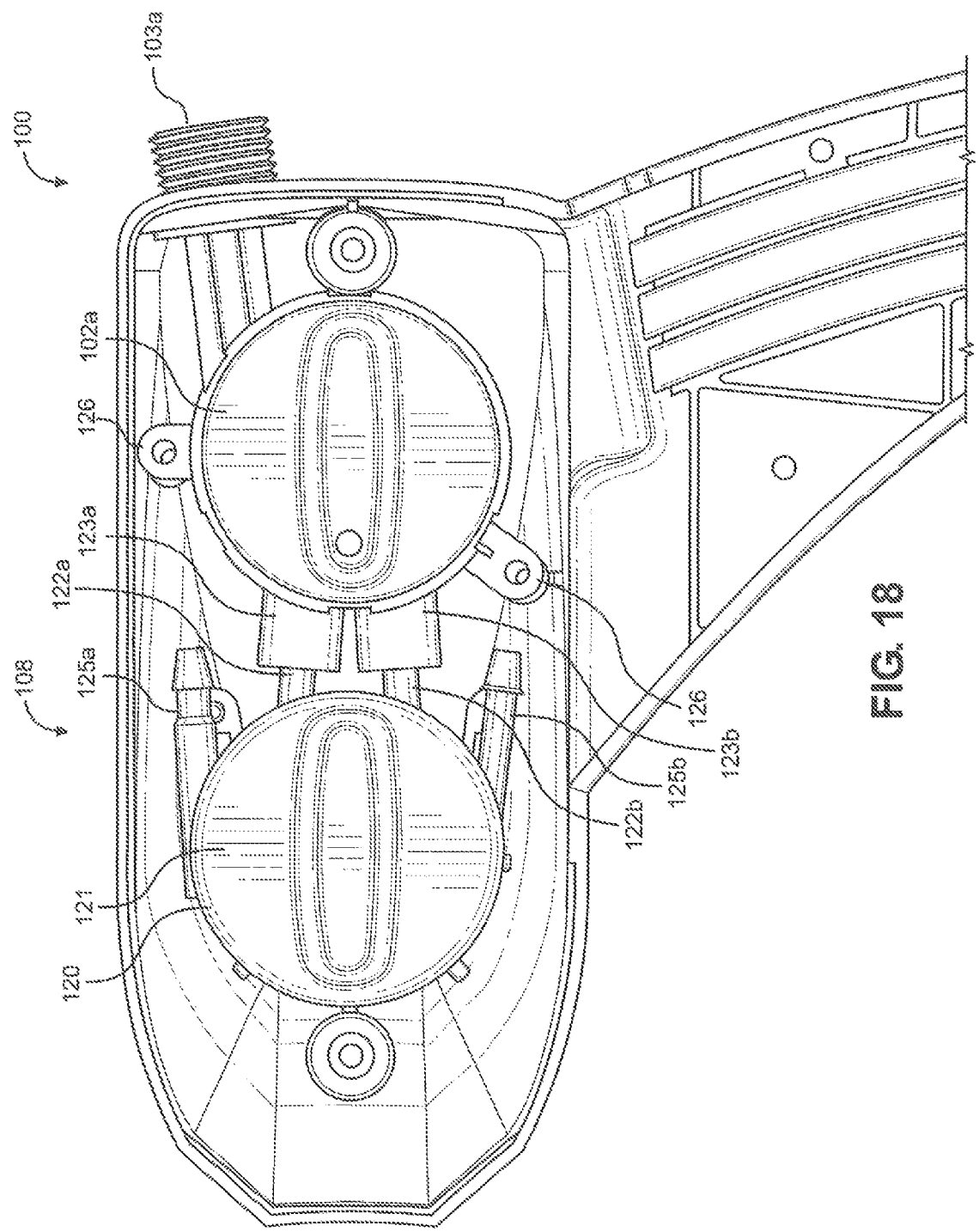
FIG. 18 illustrates a cut-away view of an embodiment of a bidet washing apparatus with a reservoir dispenser and a removable lid or cap.

FIG. 18 illustrates a cut-away view of an embodiment of a bidet washing apparatus 100 with a reservoir dispenser 120 and a removable lid or cap 121. In this figure, the apparatus includes water inlet 103a or 103b connected to control unit 108 with control switch 102a. In the on position, water can be independently transferred from control unit 108 to the reservoir dispenser 120 via first water outlets 122a and 122b (now shown) and reservoir dispenser inlets 123a and 123b, respectively. Here, the reservoir dispenser 120 includes two separate compartments 120a and 120b (see, FIG. 19), in which each compartment can independently contain soap and/or disinfectant. The resulting solution or mixture in each of these compartments can be transferred to nozzle assembly 101 for cleaning purposes via the reservoir dispenser switch 124, reservoir dispenser outlets 125a and 125b and water tubes 107c and 107d (not shown), respectively.

Figure 19:
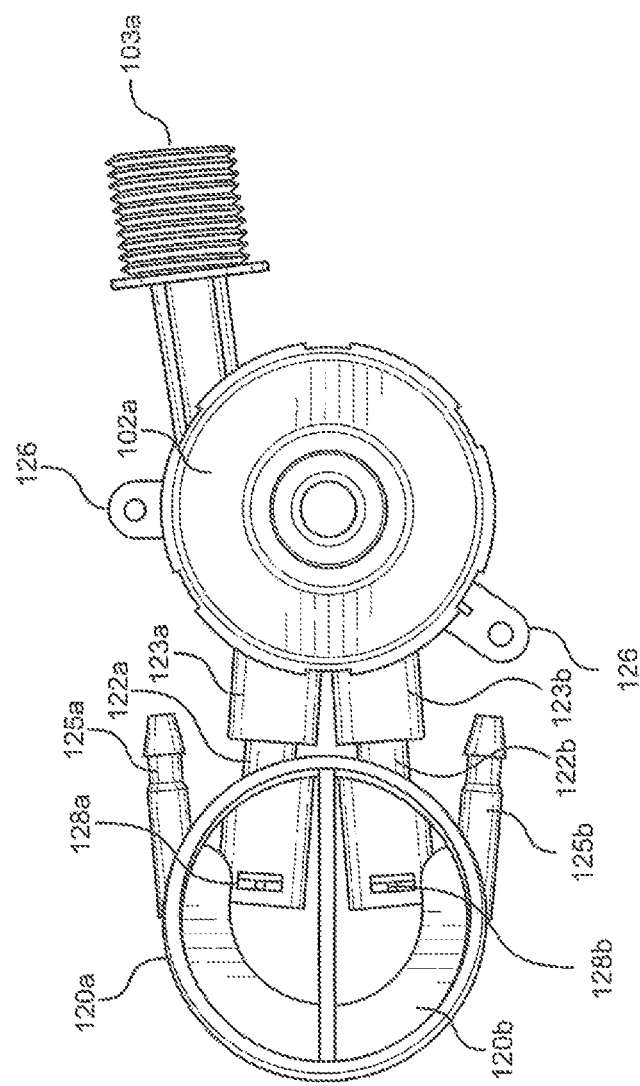
FIG. 19 illustrates a cut-away view of an embodiment of a bidet washing apparatus with a reservoir dispenser without the removable lid or cap.

FIG. 19 illustrates a cut-away view of an embodiment of a bidet washing apparatus 100 with a reservoir dispenser 120 the removable lid or cap removed. In this figure, the apparatus includes water inlet 103a or 103b connected to control unit 108 with control switch 102a. In the on position, water can be independently transferred from control unit 108 to the reservoir dispenser 120 via first water outlets 122a and 122b (now shown) and reservoir dispenser inlets 123a and 123b, respectively. Here, the reservoir dispenser 120 includes two separate compartments 120a and 120b, in which each compartment can independently contain soap and/or disinfectant. The resulting solution or mixture in each of these compartments can be transferred to nozzle assembly 101 for cleaning purposes via the reservoir dispenser switch 124, reservoir dispenser outlets 125a and 125b and water tubes 107c and 107d (not shown), respectively.

Figure 20:
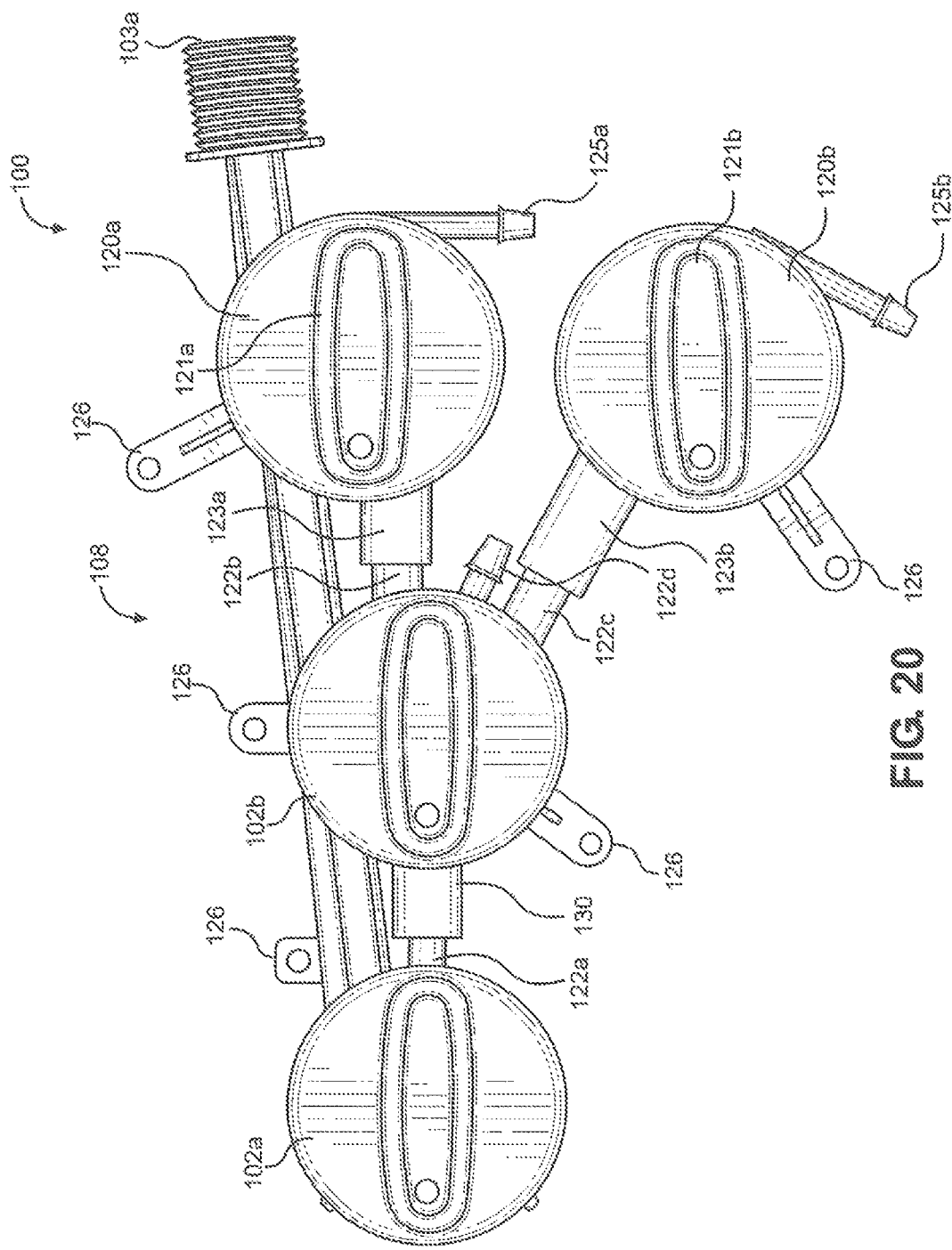
FIG. 20 illustrates a cut-away view of an embodiment of a bidet washing apparatus with two reservoir dispensers with removable lids or caps.

FIG. 20 illustrates a cut-away view of an embodiment of a bidet washing apparatus 100 with a reservoir dispensers 120a and 120b with a removable lid or cap 121a and 120b, respectively. In this figure, the apparatus includes water inlet 103a connected to control unit 108 with control switch 102a. Control switch 102a can act as an on/off switch for the incoming and out-going water. In the on position, water can be transferred from control switch 102a to control switch 102b via water outlet 122a and water inlet 130. Control switch 102b includes water outlet 122b for transferring water to the reservoir dispenser 120a via reservoir dispenser inlet 123a. Control switch 102b further includes water outlet 122c for transferring water to the reservoir dispenser 120b via reservoir dispenser inlet 123b. Ultimately, the resulting solution or mixture in the reservoir dispensers can be transferred to nozzle assembly 101 for cleaning purposes via reservoir dispenser outlet 125a and/or 125d. Finally, control switch 102b also includes water outlet 122d, which can transfer water to the nozzle assembly directly.

FIG. 21 illustrates a cut-away view of an embodiment of a bidet washing apparatus 100 with a reservoir dispenser 120 with a removable lid or cap 121. In this figure, the apparatus includes water inlet 103a connected to control unit 108 with control switch 102a. Control switch 102a can act as an on/off switch for the incoming and out-going water. In the on position, water can be transferred from control switch 102a to control switch 102b via water outlet 122a and water inlet 130. Control switch 102b includes water outlet 122b for transferring water to the reservoir dispenser 120 via reservoir dispenser inlet 123. Ultimately, the resulting solution or mixture in the reservoir dispenser can be transferred to nozzle assembly 101 for cleaning purposes via reservoir dispenser outlet 125a, 125b and/or 125c.

As a result of the foregoing description, a bidet washing apparatus is provided with an objective of satisfactorily and hygienically washing a user's body parts after toilet use. The protective shield gate, according to embodiments described herein, can provide advanced hygiene by protecting the nozzle(s) from excrement, while allowing for the easy cleaning and/or replacement of nozzle(s) as desired. Moreover, the single-body design of the connector between the water inlet(s) and the valve(s) provides for enhanced durability of the bidet washing apparatus, with decreased risk of leakage.

While the inventive features have been particularly shown and described with reference to preferred embodiments thereof, it will be understood by those in the an that the foregoing and other changes can be made therein without departing from the sprit and the scope of the disclosure. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus, the breadth and scope of the disclosure should not be limited by any of the above-described exemplary embodiments.

What is claimed is:

1. A bidet washing apparatus, comprising:
a control unit fluidically connected to one or more water inlets configured to supply water to the control unit, the control unit including one or more control unit switches configured to operate one or more control unit valves for controlling water flow from the one or more water inlets or from one or more control unit outlets;
one or more reservoir dispensers having one or more chambers fluidically connected to at least one of the one or more control unit outlets, the one or more reservoir dispensers including one or more reservoir dispenser switches configured to operate one or more reservoir dispenser valves for controlling water flow from the one or more control unit outlets or from one or more reservoir dispenser outlets;
a nozzle assembly including a washing nozzle, fluidically connected to at least one of the one or more control unit outlets with one or more control unit outlet to nozzle assembly water tubes;
a protective shield gate covering at least a portion of the nozzle assembly and washing nozzle; and
one or more openings located above the nozzle assembly fluidically connected to at least one of the one or more reservoir dispenser outlets with one or more reservoir dispenser outlet to nozzle assembly water tubes.

2. The bidet washing apparatus of claim 1, further comprising the one or more water inlets fluidically connected to a water tank configured to supply water to the control unit.

3. The bidet washing apparatus of claim 1, further comprising one or more removable lids each on the one or more reservoir dispensers.

4. The bidet washing apparatus of claim 3, further comprising a securing gate on the one or more removable lids for securing soap or disinfectant.

5. The bidet washing apparatus of claim 1, further comprising two fluidically connected control unit switches, wherein one of the control unit switches is fluidically connected to the one or more reservoir dispensers.

6. The bidet washing apparatus of claim 1, further comprising one or more control switches selected from knobs, levers, dials and depressible buttons.

7. The bidet washing apparatus of claim 1, further comprising:
one or more control unit switches, each control unit switch having two or more control unit outlets; and
one or more reservoir dispensers having two chambers, wherein each chamber is fluidically connected to one of the two or more control unit outlets.

8. The bidet washing apparatus of claim 7, further comprising one or more reservoir dispenser switches configured to operate one or more reservoir dispenser valves for controlling water flow from each of the two chambers to their one or more dispenser outlets.

9. The bidet washing apparatus of claim 1, further comprising two fluidically connected control unit switches, wherein one of the control unit switches is fluidically connected to two reservoir dispensers.

10. The bidet washing apparatus of claim 1, further comprising two fluidically connected control unit switches, wherein one of the control unit switches is fluidically connected to one reservoir dispenser.

11. The bidet washing apparatus of claim 1, further comprising the plurality of nozzle assembly outlets are positionable for directing flow of water or soap or disinfectant solution from the one or more reservoir dispensers to the nozzle assembly, the washing nozzle, or the protective shield gate.

12. The bidet washing apparatus of claim 1, further comprising a length of the protective shield gate being substantially similar to a length of the washing nozzle.

13. The bidet washing apparatus of claim 1, further comprising a securing unit configured to secure the bidet washing apparatus to a toilet bowl.

14. The bidet washing apparatus of claim 1, further comprising the washing nozzle being removably connectable to the nozzle assembly.

15. The bidet washing apparatus of claim 1, further comprising the washing nozzle being adjustable via a swivel unit, to swivel around approximately 360 degrees.

16. A bidet washing apparatus, comprising:
a control unit fluidically connected to a water inlet configured to supply water to the control unit, the control unit including a control unit switch configured to operate a control unit valves for controlling water flow from the water inlet and/or from a control unit outlet;
a reservoir dispenser having a chamber fluidically connected to the control unit outlet, the reservoir dispenser including a reservoir dispenser switch configured to operate a reservoir dispenser valve for controlling water flow from the control unit outlet and/or from a reservoir dispenser outlet;
a nozzle assembly including a washing nozzle fluidically connected to the control unit outlet with a water tube;
a protective shield gate covering at least a portion of the nozzle assembly and washing nozzle; and
a plurality of nozzle assembly and/or gate cleaning outlets fluidically connected to the reservoir dispenser outlet with a water tube.

17. The bidet washing apparatus of claim 16, further comprising a removable lid on the reservoir dispenser.

18. The bidet washing apparatus of claim 17, further comprising a securing gate on the removable lid for securing soap or disinfectant.

* * * * *